(12) United States Patent
Sleiman et al.

(10) Patent No.: US 8,336,518 B2
(45) Date of Patent: Dec. 25, 2012

(54) ROTARY MACHINE WITH ROLLER CONTROLLED VANES

(75) Inventors: Tony Sleiman, Windsor (CA); Andre Sarkis Laba, Windsor (CA); Jessie Joseph Laba, Belle River (CA)

(73) Assignee: Korona Group Ltd., Mount Hope (CA)

( * ) Notice: Subject to any disclaimer, the term of this patent is extended or adjusted under 35 U.S.C. 154(b) by 0 days.

(21) Appl. No.: 13/272,373

(22) Filed: Oct. 13, 2011

(65) Prior Publication Data
US 2012/0031368 A1 Feb. 9, 2012

Related U.S. Application Data

(63) Continuation of application No. PCT/CA2010/000559, filed on Apr. 14, 2010.

(60) Provisional application No. 61/169,769, filed on Apr. 16, 2009.

(51) Int. Cl.
| F02B 53/00 | (2006.01) |
| F01C 1/00 | (2006.01) |
| F01C 1/344 | (2006.01) |
| F04C 18/00 | (2006.01) |
| F04C 2/00 | (2006.01) |

(52) U.S. Cl. ........................ 123/243; 418/264
(58) Field of Classification Search .................. 123/243, 123/241, 235; 418/258, 259, 260, 264, 267
See application file for complete search history.

(56) References Cited

U.S. PATENT DOCUMENTS

| 2,498,029 A | 2/1950 | Clerc ............................ 418/264 |
| 3,001,482 A | 9/1961 | Osborn ......................... 418/264 |
| 3,250,260 A | 5/1966 | Heydrich ...................... 123/243 |
| 3,301,233 A | 1/1967 | Dotto et al. ................... 123/243 |
| 3,485,179 A | 12/1969 | Dawes ........................... 418/265 |
| 3,568,645 A | 3/1971 | Grimm .......................... 418/264 |
| 3,904,327 A | 9/1975 | Edwards et al. .............. 418/264 |

(Continued)

FOREIGN PATENT DOCUMENTS

CN 1459549 12/2003

(Continued)

OTHER PUBLICATIONS

International Preliminary Report on Patentability for International Application No. PCT/CA2010/000559, mailed Jul. 27, 2011, 3 pages.

*Primary Examiner* — Thai Ba Trieu
(74) *Attorney, Agent, or Firm* — Michael J. Gallagher; David J. Dawsey; Gallagher & Dawsey Co., LPA

(57) ABSTRACT

A rotary machine is provided, having a stator forming a chamber for a rotor, the stator having two sidewalls defining opposite sides of the chamber and a substantially continuous, circumferentially extending inner wall, and at least one inlet and outlet. A rotor and stator define two cavities at opposite ends of the chamber. The rotor has at least two radially extending slots and at least two radially movable vanes having first and second primary rollers and first and second secondary rollers mounted on a radially inward section of the vane. Two roller cam devices are each provided on a respective one of the stator side walls and are positioned centrally adjacent opposite sides of the rotor. In use, outer tips of the vanes slidingly engage the inner wall of the stator. The primary rollers limit outward vane movement due to centrifugal forces. Secondary rollers limit and control inward vanes movement.

19 Claims, 19 Drawing Sheets

| U.S. PATENT DOCUMENTS | | | |
|---|---|---|---|
| 4,410,305 A | 10/1983 | Shank et al. | 418/264 |
| 5,092,752 A | 3/1992 | Hansen | 418/137 |
| 5,375,985 A | 12/1994 | Pipaloff | 418/6 |
| 5,415,141 A | 5/1995 | McCann | 123/243 |
| 5,524,587 A | 6/1996 | Mallen et al. | 123/243 |
| 5,634,783 A | 6/1997 | Beal | 418/264 |
| 5,711,268 A | 1/1998 | Holdampf | 123/243 |
| 6,659,067 B1 | 12/2003 | Al-Hawaj | 123/243 |
| 6,681,738 B2 | 1/2004 | Endoh et al. | 418/264 |
| 6,684,847 B1 | 2/2004 | Al-Hawaj | 123/243 |

| FOREIGN PATENT DOCUMENTS | | |
|---|---|---|
| DE | 3705079 A1 | 10/1987 |
| EP | 0 007180 A1 | 1/1980 |
| EP | 0 013017 B1 | 6/1989 |
| GB | 150416 | 8/1920 |
| GB | 150416 | 8/1920 |
| GB | 442418 | 2/1936 |
| JP | 2005-25609 A | 9/2005 |
| SU | 1301987 | 4/1987 |
| WO | WO 2007/062116 | 5/2007 |

ROTARY MACHINE WITH ROLLER CONTROLLED VANES

CROSS-REFERENCE TO RELATED APPLICATIONS

This application is a Continuation of, and claims priority to, co-pending International Application PCT/CA2010/000559, having an international filing date of Apr. 14, 2010; and published as WO/2010/118518 on Oct. 21, 2010; which in turn claims priority to U.S. Provisional Patent Application 61/169,769; filed Apr. 16, 2009.

STATEMENT REGARDING FEDERALLY SPONSORED RESEARCH OR DEVELOPMENT

Not applicable.

TECHNICAL FIELD

The present disclosure relates generally to the field of rotary engines, pumps and compressors, in particular, a rotary machine with roller controlled vanes.

BACKGROUND OF THE INVENTION

A wide variety of rotary type engines and compressors are known in their respective arts. One reason for the development of rotary type engines is that in some respects they are more efficient than the well-known internal combustion engines which employ a plurality of pistons each disposed within a cylinder and connected to a crankshaft through a connecting rod. For instance, a great deal of heat and mechanical energy is wasted during the transfer of the linear, reciprocating motion of the piston to the rotating motion of the crank shaft.

A variety of rotary engines have been developed which employ sliding vanes mounted in slots in the rotor. One such rotary power device is described in U.S. Pat. No. 6,684,847 issued Feb. 3, 2004. The vanes are equally spaced about the rotor and divide the rotor chamber into discrete cavities. As the rotor returns, the vanes follow the wall contour of the motor chamber so that the cavities rotate with the rotor and expand and contract as the rotor turns. Each vane includes a vane plate portion, a pin fixable to the base of the vane and protruding through slots in the sides of the rotor, and cam follower rollers rotatably mounted at the outer ends of the pin and engaging guide cam grooves formed in side plates of the engine. As the rotor spins, the vanes reciprocate radially outward and inward relative to the rotor with the motion of the vanes being controlled by the cam grooves so that the vane tips come close to contacting the inner wall of a middle portion of the external stator.

Published PCT Patent Application No. WO 2007/062116 also describes a rotor having a number of radially extending slots in which movable vanes are mounted. The rotor is mounted in a chamber formed in an engine block. Movement of each vane is controlled by means of cam rollers mounted on opposite side edges of each vane. The cam rollers engage cam devices which have inner and outer tracks with smaller rollers on each vane engaging the outer track and larger rollers engaging the inner track. In this engine construction, there are also rollers mounted in the rotor to rollably support each vane as it moves in and out of its slot in the rotor.

Although the internal combustion engine illustrated and described in the aforementioned PCT application has a number of advantages over prior art designs and is efficient in its operation compared to known prior designs, the present applicants have improved this rotary engine design to provide a better cam and cam roller construction for controlling the radial movement of the vanes, to provide a rotor which is easier and less expensive to construct and which enables the efficient mounting of support rollers for the vanes, and in the case where auto ignition of fuel in the engine is desired, by providing a pressure transferring arrangement in the block in a location between combustion and compression chambers.

SUMMARY OF THE INVENTION

In its most general configuration, the presently disclosed design advances the state of the art with a variety of new capabilities and overcomes many of the shortcomings of prior devices and methods in new and novel ways. In its most general sense, the presently disclosed rotary machine overcomes the shortcomings and limitations of the prior art in any of a number of generally effective configurations.

According to one embodiment of a rotary machine, such a rotary engine, pump or compressor, constructed in accordance with the present disclosure, the rotary machine comprises a stator forming a chamber for a rotor, this stator have two sidewalls defining opposite sides of the chamber and a substantially continuous, circumferentially extending inner wall. The stator has at least one inlet and at least one outlet. There is also a rotor mounted in the chamber for rotation about a central axis of rotation and defining with the stator two cavities at opposite ends of the chamber. The rotor has at least two radially extending slots evenly spaced about the central axis. At least two radially movable vanes are each mounted in a respective one of these slots and each has first and second primary rollers and first and second secondary rollers mounted on a radially inward section of the vane. The first primary and secondary rollers are mounted on a first side edge of their respective vane and the second primary and secondary rollers are mounted on a respective second side edge of their respective vane. Two roller cam devices are each provided on a respective one of the stator side walls and are positioned centrally adjacent opposite sides of the rotor. The roller cam devices each form primary and secondary camming surfaces for engaging and controlling radial movement of the primary and secondary rollers respectively. Their camming surfaces are formed inside the roller cam devices and the primary and secondary camming surfaces of each roller cam device are offset from each other in an axial direction and in a substantially radial direction relative to the axis of rotation. During operation of the rotary machine, outer tips of the vanes slidingly engage the circumferentially extending inner wall of the stator. The primary rollers limit outward movement of the vanes due to centrifugal forces acting on the vanes and thereby limit substantially transfer of the forces to the inner wall. The secondary rollers limit and control inwards movement of the vanes. In an exemplary version of this rotary machine, each roller cam device is detachably connected by threaded fasteners to its respective stator sidewall. During operation of the rotary machine, the primary rollers on each vane rotate in an opposite direction compared to the direction of rotation of the secondary rollers.

These and other aspects of the disclosed rotary machine will become more apparent to those having ordinary skill in the art from the following detailed description taken in conjunction with the drawings provided herewith.

Numerous variations, modifications, alternatives, and alterations of the various preferred embodiments, processes, and methods may be used alone or in combination with one another as will become more readily apparent to those with skill in the art with reference to the following detailed description of the preferred embodiments and the accompanying figures and drawings.

BRIEF DESCRIPTION OF THE DRAWINGS

So that those having ordinary skill in the art to which the present disclosure pertains will more readily understand how to make and use the subject invention, exemplary embodiments thereof will be described now in detail with reference to the drawings. Without limiting the scope of the rotary machine as disclosed herein and referring now to the drawings and figures.

Figure 1:
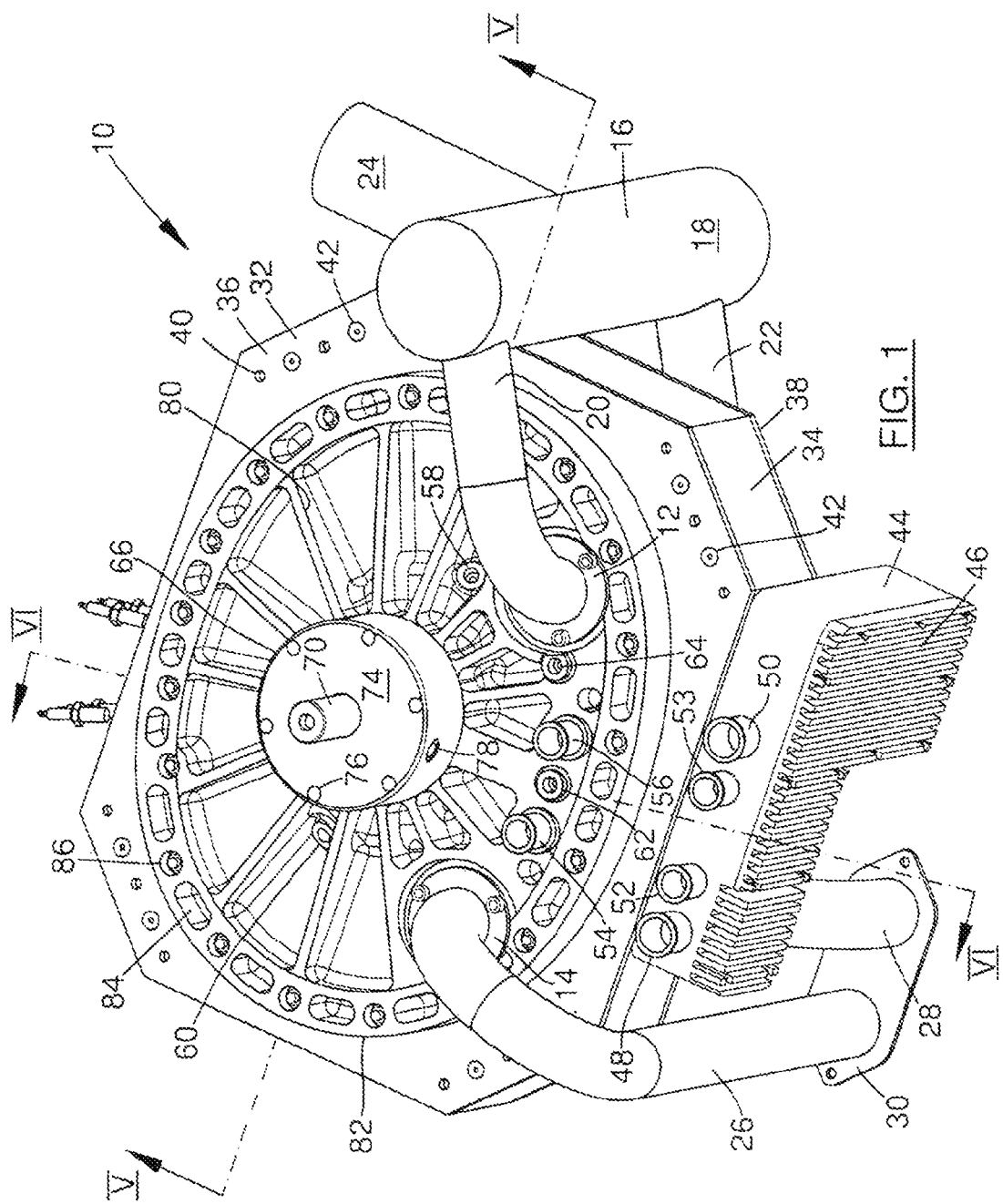
FIG. 1 is a perspective view of an embodiment of an internal combustion engine according to the present invention, this view showing one side cover on one side of the engine block and a bottom side of the block.

These drawings are provided to assist in the understanding of the exemplary embodiments of the rotary machine as described in more detail below and should not be construed as unduly limiting the rotary machine. In particular, the relative spacing, positioning, sizing and dimensions of the various elements illustrated in the drawings are not drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

The presently disclosed rotary machine 10 enables a significant advance in the state of the art. The preferred embodiments of the rotary machine 10 accomplish this by new and novel arrangements of elements and methods that are configured in unique and novel ways and which demonstrate previously unavailable but preferred and desirable capabilities. The description set forth below in connection with the drawings is intended merely as a description of the presently preferred embodiments of the rotary machine 10, and is not intended to represent the only form in which rotary machine 10 may be constructed or utilized. The description sets forth the designs, functions, means, and methods of implementing the rotary machine 10 in connection with the illustrated embodiments. It is to be understood, however, that the same or equivalent functions and features may be accomplished by different embodiments that are also intended to be encompassed within the spirit and scope of the claimed rotary machine 10.

Figure 2:
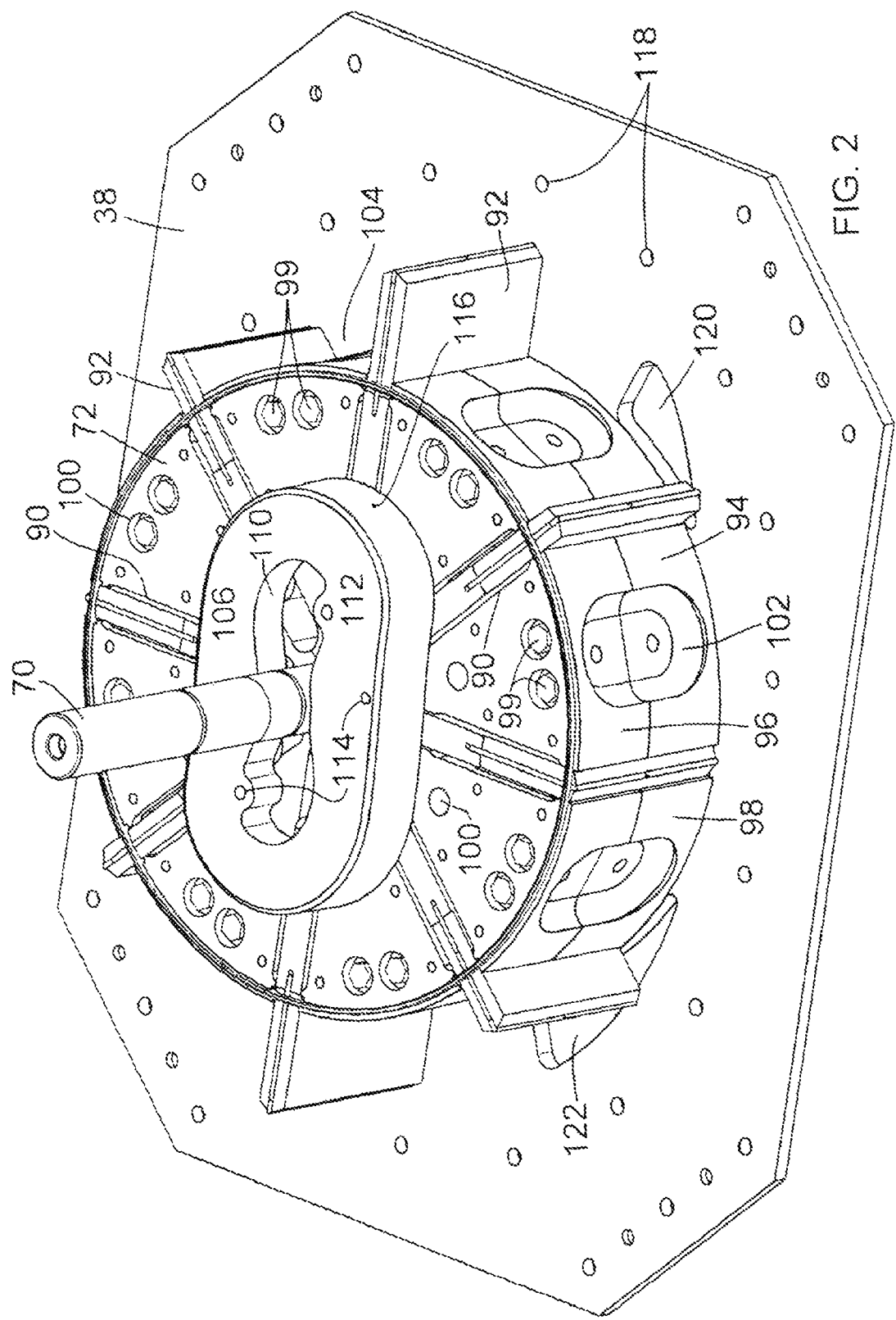
FIG. 2 is another perspective view showing engine components which include a rotor and its central shaft, vanes mounted in the rotor, a side cover of the block, and a cam device.
Figure 3:
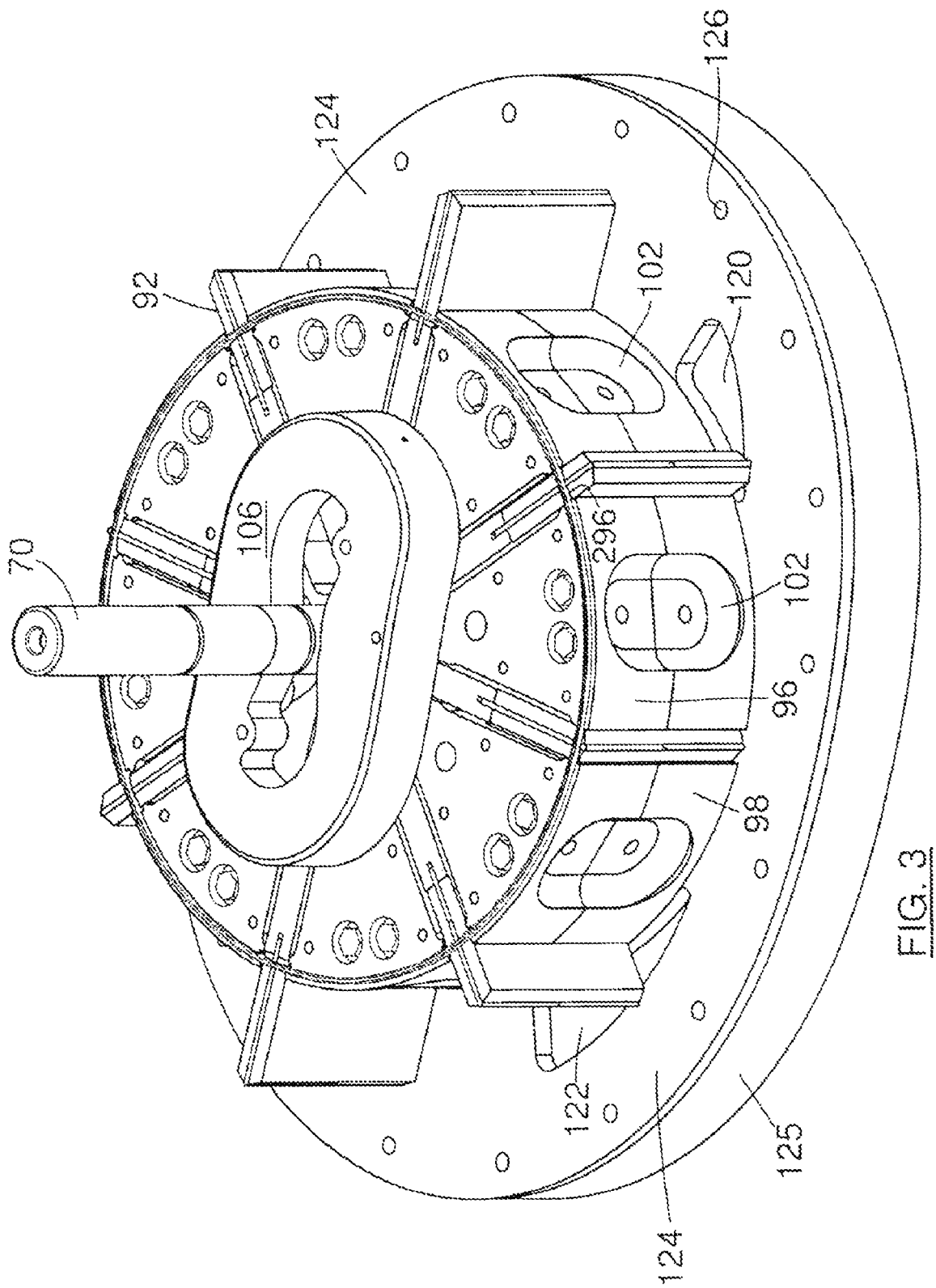
FIG. 3 is a perspective view similar to FIG. 2 but illustrating an alternate form of side cover forming one side of the engine.
Figure 4:
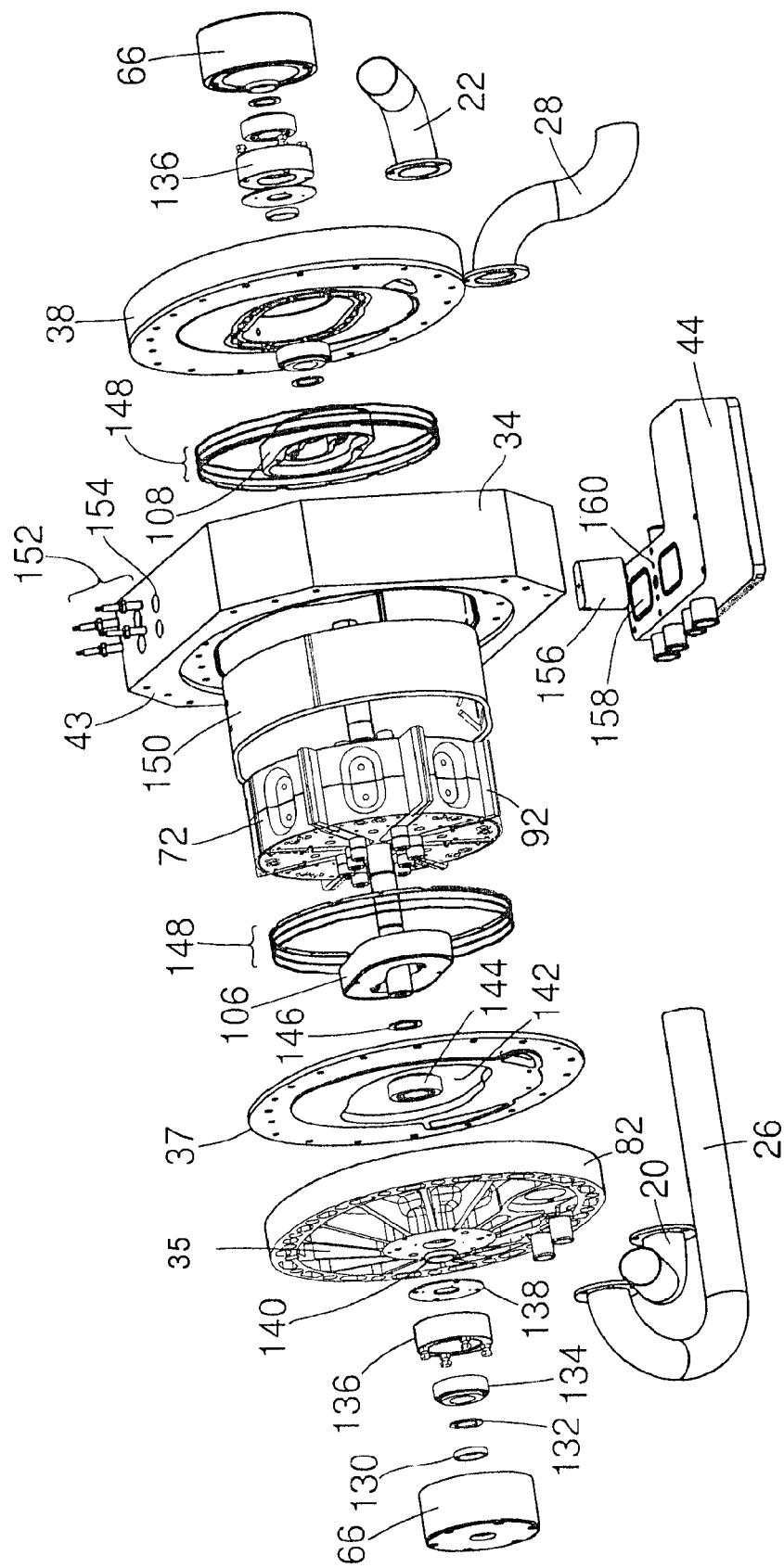
FIG. 4 is an exploded view of the internal combustion engine of FIG. 1.

With reference generally to FIGS. 1-19 a rotary internal combustion engine 10 and its various components are illustrated in FIGS. 1, 2 and 4; with a variation in the engine design being illustrated in FIG. 3. In a number of respects this engine incorporates features of the rotary engine illustrated and described in applicant's published PCT Patent Application No. WO2007/062116, the description and drawings of which are incorporated herein by reference.

As seen well in FIG. 1, the engine has two inlet ports 12 located on opposite sides of the engine and also two exhaust ports 14 located on opposite sides of the engine. Although the illustrated engine has a pair of each of these ports, the present engine can also be constructed with a single inlet port 12 and a single exhaust port 14, if desired. A fuel air mixture is delivered to the engine by means of an intake manifold 16 which can include a cylindrical, closed end pipe section 18 and two curved connecting pipes 20, 22, each extending to a respective one of the inlet ports. A further intake conduit 24 can deliver the fuel/air mixture to the pipe section 18. Exhaust pipes 26, 28 can be connected by bolts to the exhaust ports 14 and, as illustrated, both of these are supported by a mounting plate 30 at one end, this plate being mountable by bolts to a rigid support surface.

The engine 10 includes a non-rotating stator or housing 32 which includes a main engine block 34 to the sides of which can be detachably connected a first side cover 36 and a second side cover 38 which can be seen more clearly in FIG. 2. Each cover plate is formed with sets of fastener holes 40 for receiving fasteners such as bolts 42, only some of which are shown in FIG. 1. The bolts extend into corresponding apertures 43 (see FIG. 4) formed on each side of the block. Detachably mounted on the bottom side of the block is an oil collector 44 which, in the illustrated exemplary embodiment is formed on its outer surface with a series of cooling ribs 46. This oil collector can be used for the purpose of collecting oil from the bottom side of the engine, for providing oil to the engine chamber, and also for conducting coolant to and from a water pump (not shown). Two coolant pipe connectors 48, 50 are provided on one side of the collector to connect coolant pipes which conduct coolant to and from the water pump. Two additional pipe connectors 52, 53 are located between the connectors 48, 50 and these are used to connect coolant pipes that conduct coolant to and from the engine through coolant ports 54, 56.

Also shown in FIG. 1 are two oil feed ports 58, 60 through which oil is fed to lubricate cam rollers as described hereinafter. Oil return lines are connected to two oil outlets 62, 64. Mounted in the center of each engine cover is a cylindrical bearing cap 66 which protects an outer main bearing 134 for center shaft 70 that supports engine rotor 72 shown in FIG. 2. The cap includes a circular cover 74 held in place by bolts in holes 76. The cap protects the bearing from dust and debris. Formed on one side of the cap is an oil feed port 78 through which oil can be provided to the main bearings which support the shaft 70.

Each engine cover can be formed with a series of radially extending ribs 80 which extend to an oval-shaped cover section 82. To reduce the weight of this cover section it can be formed with a number of elongate openings 84 between at least some of which can be formed a series of round openings 86 which accommodate threaded fasteners used to clamp the two covers 36, 38 to the central block 34.

With reference now to FIGS. 2 and 3, it will be seen that the rotor 72 is substantially cylindrical and is formed with two or more radially extending slots 90 in which are reciprocally mounted plate-like vanes 92. The illustrated exemplary rotor has eight slots 90 and eight vanes 92. The rotor has a cylindrical surface 94 which is broken into sections by the slots. The rotor can comprise two round, half rotor sections 96, 98 which are detachably connected together by means of bolts 99. The illustrated rotor has eight pie-shaped sections and in each side of each section are formed three countersunk fastener openings 100, two of which are near the circumferentially periphery of the rotor and the third closer to the center of the rotor. Formed in each pie shaped section is a combustion recess 102, one half of which can be formed in each of the rotor sections 96, 98. There is one combustion recess formed between each pair of adjacent vanes. In the present engine, the area between the vanes along with the combustion recesses form variable chambers or cavities generally indicated at 104 and shown best in FIG. 7. These chambers, which vary in size as the rotor rotates, are used for several functions including combusting the air and fuel mixture as will be described later.

Detachably mounted adjacent each flat side of the rotor is a cam device 106, 108 which is generally oval shaped on its exterior. It has a central opening 110 through which the shaft 70 extends. This opening is formed in a flat outer wall 112 and formed in this wall are fastener holes 114 which are used to attach the cam device to the adjacent engine cover. There can be formed in both curved ends of the cam device a small oil feed hole 116 through which oil is fed to the interior of the cam device. The flat plate shown in FIG. 2 is the second side cover 38 for the engine or it can be an additional protective plate (such as a steel plate) provided between the actual engine cover and the block 34 depending upon the particular engine construction desired. The plate 38 can be formed with a series of bolt holes 118 through which bolts for attaching an outer oval-shaped engine cover (shown in FIG. 1) extend. The provision of an additional flat plate between the actual engine cover and the block has the advantage of enabling easy access to water jackets formed in the stator. Also formed in plate 38 is an intake port opening 120 and a somewhat larger exhaust port opening 122.

The engine components shown in FIG. 3 are substantially similar to those shown in FIG. 2 except for the construction of the engine cover. This oval-shaped cover can be constructed as a single metal piece which is bolted to the engine block or it can be formed as two pieces joined together. If desired the cover can be cast as a single piece. If it is made of two pieces, these can comprise a flat steel plate section 124 and an outer aluminum section 125. Extending around the cover are a series of fastener holes 126 through which the fasteners extend to attach the cover to the block.

Turning now to the exploded view of FIG. 4, the various components which make up the engine 10 will be described going from left to right. The two above described bearing caps 66 are at opposite sides of the figure. Shown next to the bearing cap 66 on the left is a shaft seal 130 followed by a snap ring 132 used to fix the position of the outer bearing. The outer main bearing 134 for the rotor shaft is located adjacent to a bearing pre-load cup 136 which helps to eliminate backlash on the bearing and which is held by bolts. Next to this cup is an interior shim plate 138 which can be made of steel. The shim plate forms a protective surface against which set screws can push. Between the shim plate and the engine cover is a second shaft seal 140. The oval-shaped cover 35 shown in FIG. 4 has incorporated therein a cooling jacket, that is, a series of passageways through which coolant can flow to help cool the engine from this side.

Adjacent to the oval-shaped cover 35 is a separate, flat plate 37 which is used to seal this side of the engine block, and which, as shown, is oval shaped. However, it will be understood that the plate will be shaped to fit the exterior contour of the engine block, whatever that contour may be. As indicated, instead of being a separate plate 37, it can be formed as a single piece which combines the oval-shaped cover 35 with the plate. The plate 37 is formed with an oval-shaped central opening 142 into which the adjacent cam device can be mounted. Shown in the middle of this opening is an inner main bearing 144 and next to this bearing is a further snap ring 146 to hold the inner bearing in place on the shaft. Shown between the cam device 106 and the rotor is a rotor spring assembly 148 described in detail below. Shown between the rotor and the block 34 is an optional separate liner 150 which can, for example, be a steel liner extending around the rotor chamber and providing a protective layer within the block which in many examples of the engine can be made of aluminum alloy. Mounted on top of the block is a set of four spark plugs 152 which can be of standard construction. Four ports 154 can be formed in the block to receive the spark plugs or ignitors. As explained in the aforementioned published application, the purpose of the plurality of plugs is to enable an air-fuel mixture to be ignited at different points during the rotation of the rotor as the speed of rotation of the rotor changes.

Inserted inside the bottom section of the block and connected to the oil collector 44 is an oil feed and return block 156. Shown at the top of the collector 44 are two larger openings 158 for coolant flow into and out of the block 34. Located between these openings is a smaller hole 160 which is used to feed oil to the rotor chamber while holes on opposite sides of the hole 160 are provided for oil being collected from the rotor chamber, that is returning from this chamber. It will be understood that the engine block 34 has incorporated therein (in a manner known per se in the art) a water cooling jacket in which coolant flows to cool the block. The block illustrated in FIG. 4 is a closed block with the passageways of the cooling jacket not being visible.

Figure 5:
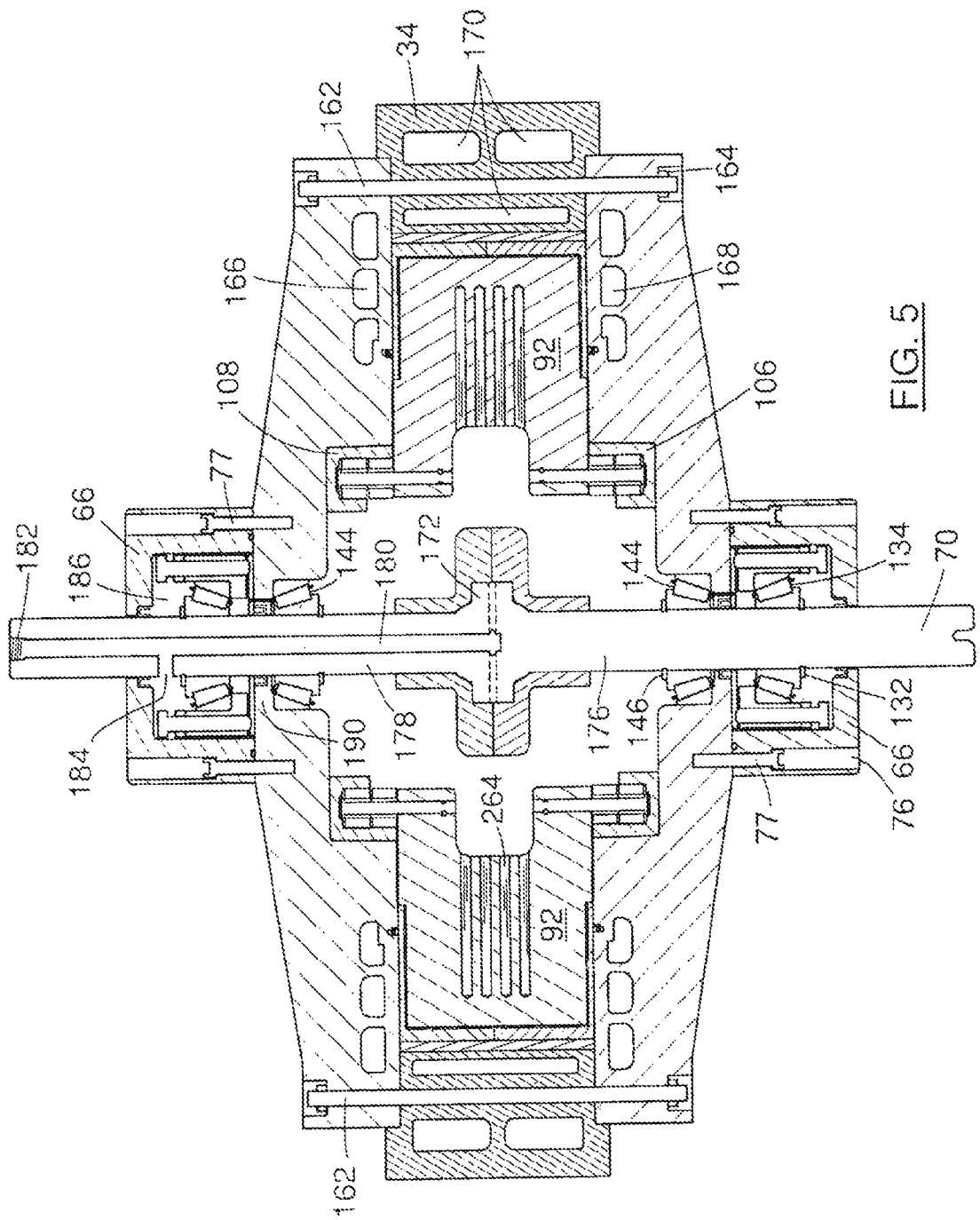
FIG. 5 is an axial cross-sectional view taken along the line V-V of FIG. 1 and taken through the axis of rotation of the rotor, this view showing two vanes mounted on opposite sides of the rotor.
Figure 6:
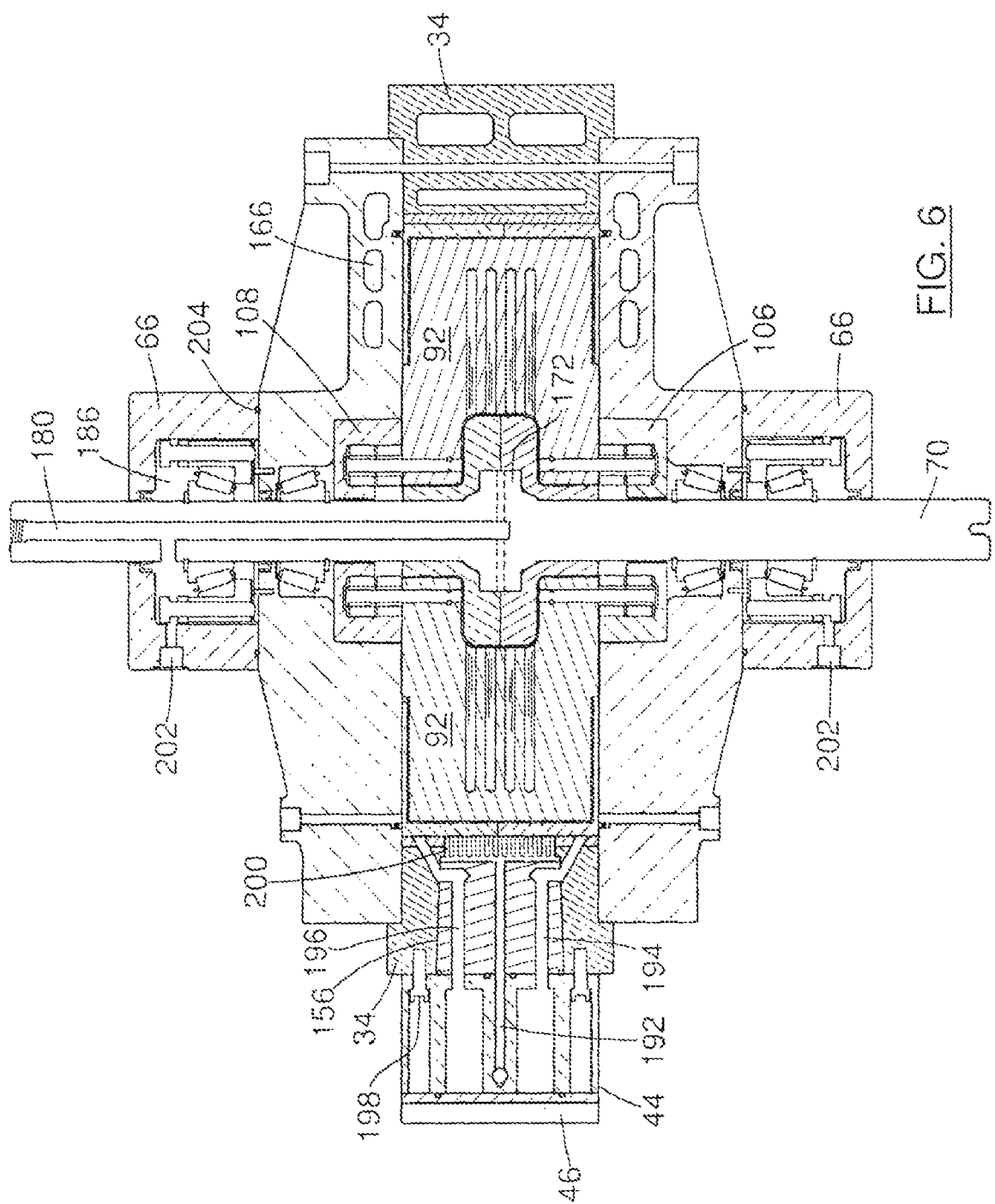
FIG. 6 is another cross-sectional view of the engine of FIG. 1, this view being taken along the line VI-VI and showing oil passageways running from a bottom side of the engine block.

Alternatively, the block can be an open block wherein the passageways for coolant are closed off by the engine covers on opposite sides of the block which are suitably sealed. FIGS. 5 and 6 are axial cross sectional views of the engine which show additional features thereof. Shown in FIG. 5 are elongate threaded fasteners 162 which are used to clamp and secure the two engine covers to the block 34. A nut 164 can be used at one or both ends of each fastener. A series of coolant passageways 166 and 168 can be seen formed in the two engine covers and further coolant passageways 170 are shown in the block 34. Bolts 77 for holding each bearing cap 66 in place can be seen. In FIG. 5, the two illustrated vanes 92 are fully extended while the vanes are shown in their radially innermost position in FIG. 6.

Figure 14:
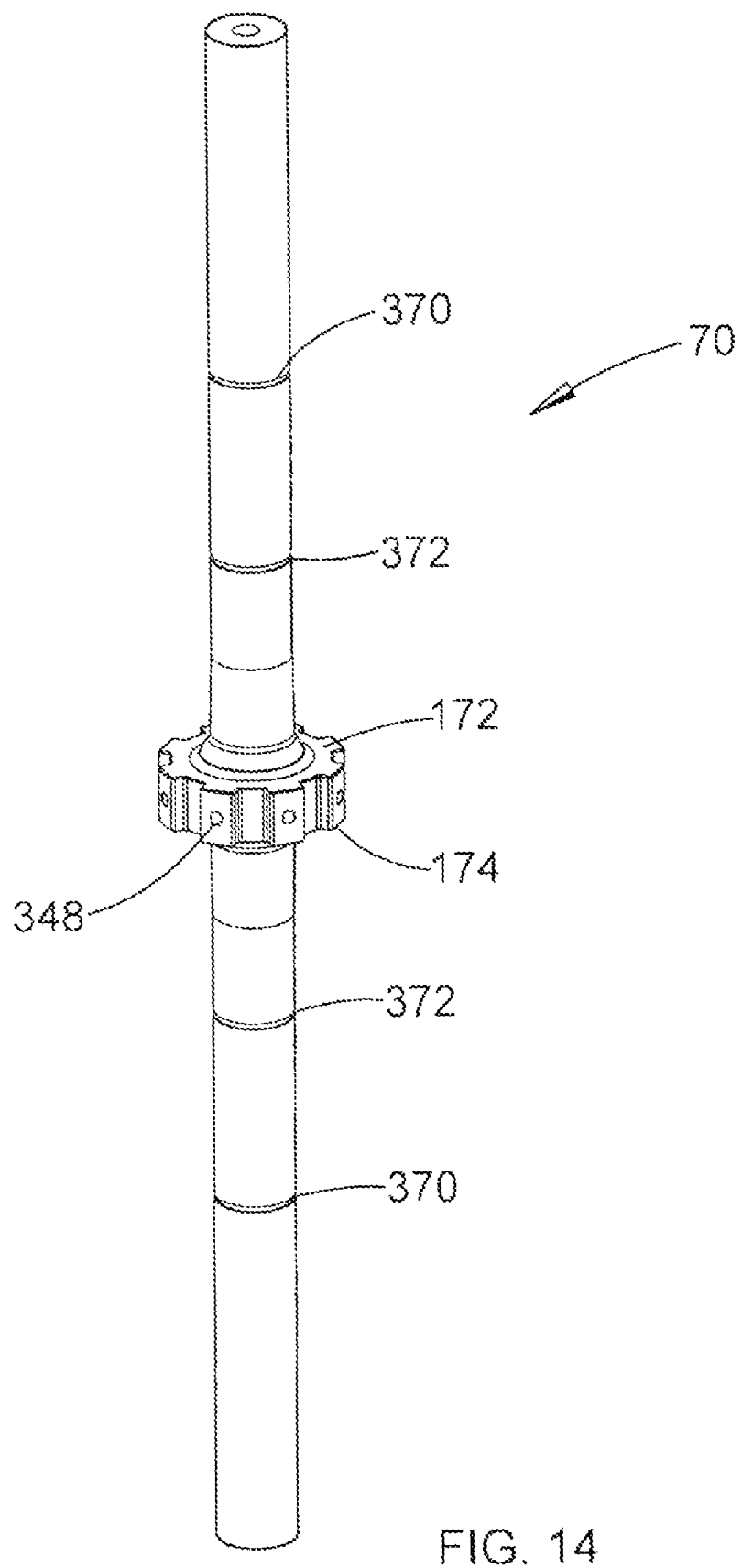
FIG. 14 is a perspective view of an exemplary version of rotor shaft made as a single piece.

An exemplary construction of the rotor shaft 70 can be seen from FIGS. 5, 6 and 14. The shaft is formed with a central section 172 of wider diameter on which a series of flat-topped lugs 174 are formed. These lugs engage co-operating notches formed about the central hole of the rotor and thus the rotor is prevented from rotating relative to this shaft. About one half 176 of this shaft is solid steel while the other half 178 has a central oil feed passageway 180 formed therein. The passageway 180 is threaded at end 182 to receive a plug (not shown). Oil is fed into the shaft through oil inlet 184 located in the side of the shaft and in one of the caps 66. Lubricating oil is fed into the chamber 186 of the cap. This oil lubricates not only the main shaft bearings but is also fed into passageways in the rotor in order to lubricate the rollers for the vanes as described further below. Also a bypass hole (not shown) is provided at 190 to feed oil from the interior of the cap to the inner main bearing. Power can be delivered through the solid half 176 of the shaft which is the stronger half since it has no central passageway.

FIG. 6 is a central cross section of the engine taking in the direction of the shorter side of the engine. This view shows a cross section of the oil collector 44. Extending from the oil collector and into the bottom side of the block is an oil feed passageway 192 and located on opposite sides of this central passageway are two oil return passageways 194, 196. Also visible are bolts 198 used to detachably connect the oil collector to the bottom of the block. A series of closely spaced, small holes or passageways 200 evenly distribute oil across the width of the rotor chamber. The inner ends of these passageways 200 are visible in FIG. 18. These passageways provide good lubrication to the vane tips and the vane seals. Also, visible in FIG. 6 are oil inlets 202 through which oil can be fed under pressure into the bearing caps 66. The joint between each bearing cap and the engine cover is sealed by an annular gasket 204.

Figure 7:
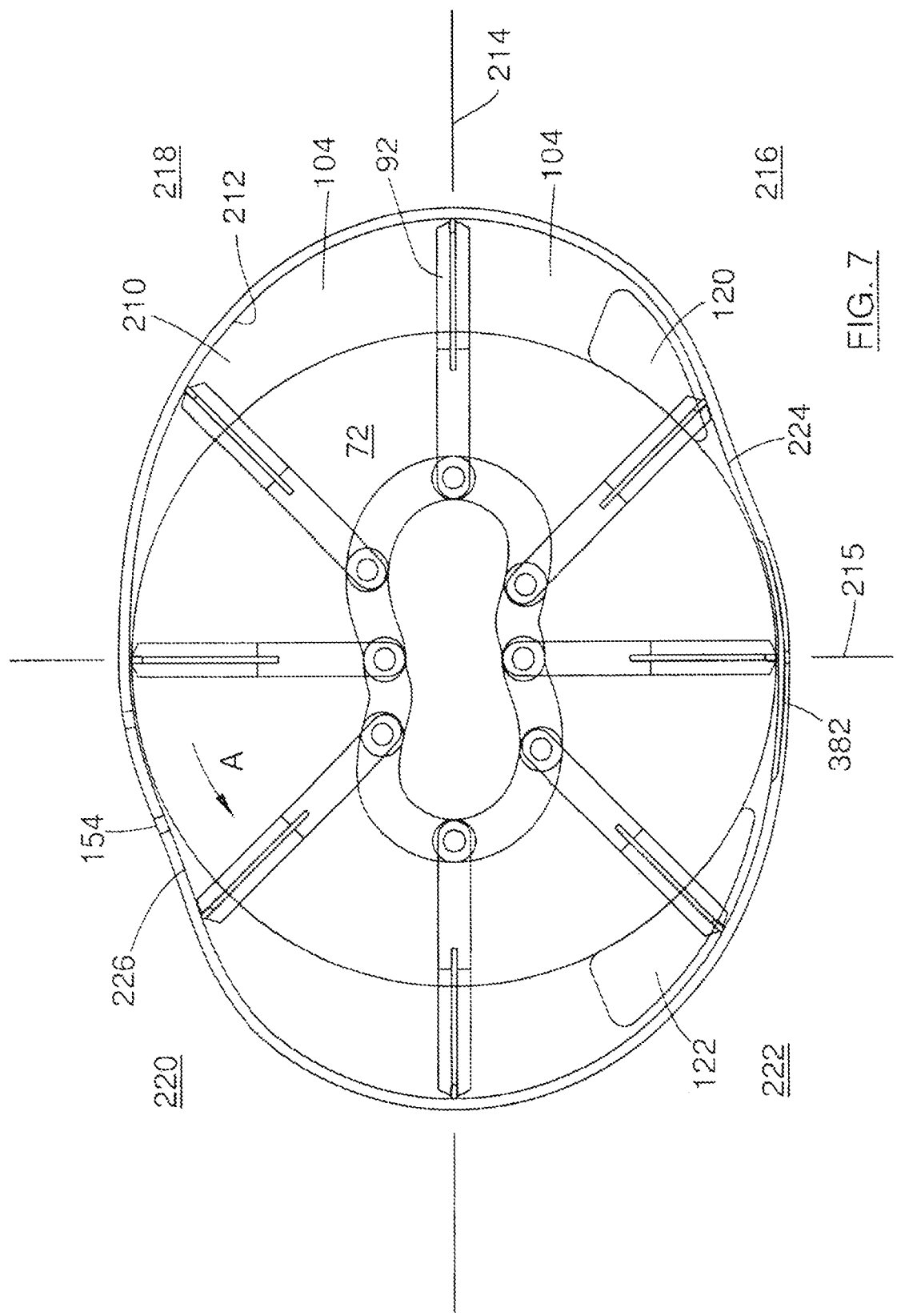
FIG. 7 is a cross-sectional schematic view illustrating the rotor, its surrounding chamber, and the control rollers of the vanes running on parallel tracks.

FIG. 7 illustrates that the stator including the engine block 34 forms a substantially oval-shaped chamber indicated generally at 210 for the rotor 72. The block forms a substantially continuous, circumferentially extending inner wall 212 along which the vane tips move as the rotor rotates. For present purposes, it can be assumed that the rotor is rotating in the counter clockwise direction indicated by the arrow A shown in FIG. 7. The engine 10 can be considered as having a first axis 214 and a second axis 215 perpendicular to the first axis with both axes being perpendicular to the central shaft 70. These axes effectively divide the engine into four quadrants including a first quadrant 216, a second quadrant 218, a third quadrant 220 and a fourth quadrant 222. Each quadrant performs a different part of the cycle of the engine operation with the first quadrant 216 being the intake cycle wherein the air/fuel mixture is drawn into the engine through intake openings 120 by the vane or vanes passing through this quadrant. The second quadrant is where the compression cycle takes place with the air/fuel mixture being compressed as the vane passing through this quadrant moves radially inwardly. The third quadrant 220 is where the power cycle occurs as the exploding mixture forms rapidly expanding gases to push against the extended vane passing through this quadrant. The fourth quadrant 222 is where the exhaust cycle takes place and the exhaust gases are pushed by the vanes out through the outlet or outlets 122.

It will be seen from FIG. 7 that the shape of the inner wall 212 is not a simple oval shape in an exemplary version of the engine. There are slight, smoothly rounded inwardly extending wall sections 224, 226 on opposite sides of the rotor chamber. Only the inwardly extending wall section 226 is functionally significant from the standpoint of engine operation with the other wall section 224 being provided simply for better engine balance which helps prevent vibration. The reason for the rounded wall section 226 in the third quadrant 220 and in the region where the spark plugs are located is to increase the thermo-dynamic efficiency of the engine by reducing the rate of volume increase during a combustion cycle thereby reducing the rate of heat loss.

Because of these advantages, this unique shape for the block chamber promotes a more complete combustion of the air/fuel mixture. The shape also reduces negative torque by keeping the trailing vane recessed in the rotor for a longer period of time while allowing the leading vane to extend and turn the rotor from the expanding gases pressing on the surface of the leading vane.

Figure 8:
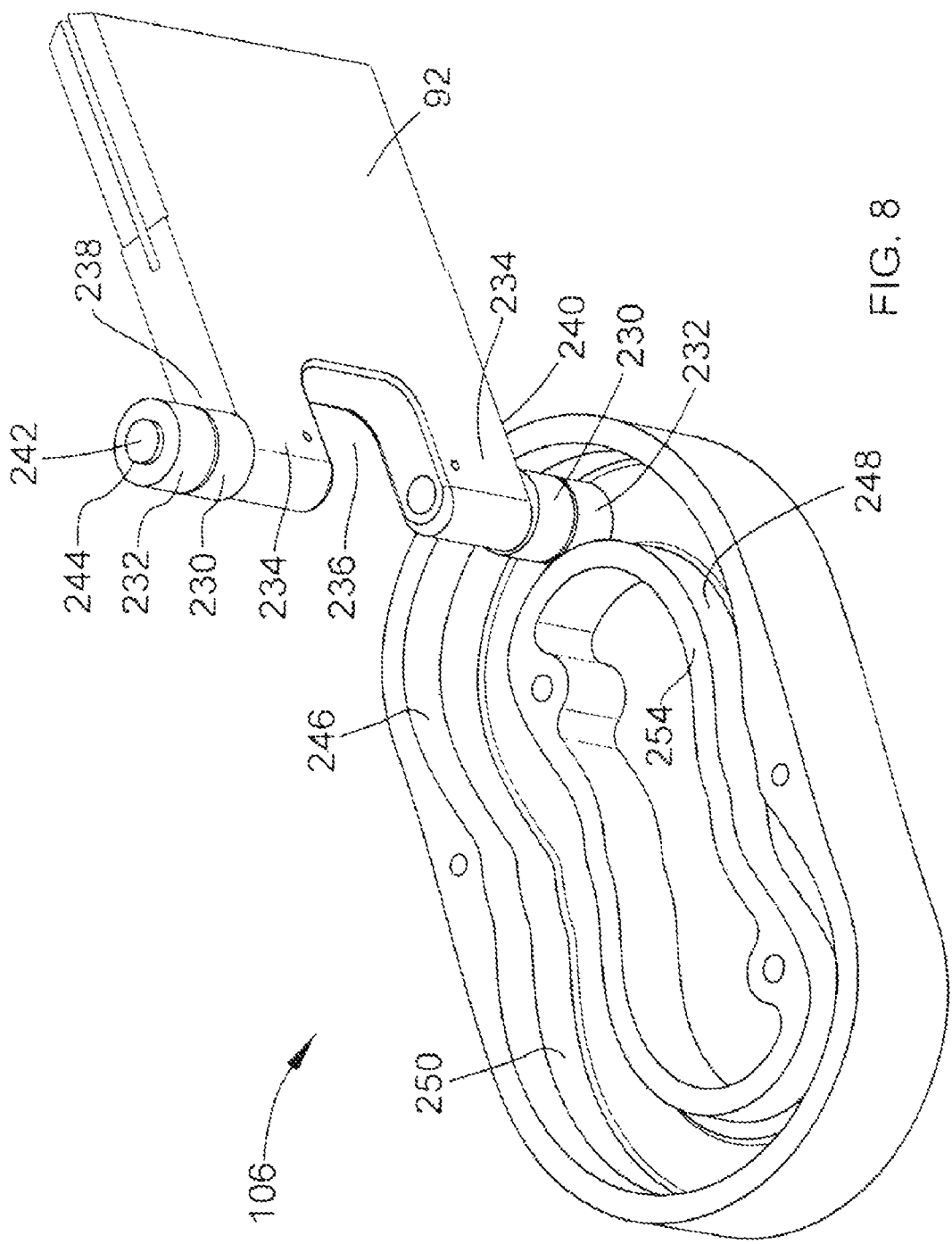
FIG. 8 is a perspective view of one of the cam devices shown with one of the rotor vanes with its two control rollers on one side running on cam tracks of the cam device.

Referring now to FIG. 8, this figure shows in perspective one cam device 106 and one of the vanes 92. Each vane 92 has first and second primary rollers 230 and first and second secondary rollers 232 mounted on a radially inward section 234 of the vane. In the exemplary vane shown there are two sections 234 separated by a U-shaped gap 236. The first primary and secondary rollers are mounted at a first side edge 238 of the vane 92 while the second primary and secondary rollers are mounted at an opposite second side edge 240 of the vane. Each pair of rollers 230, 232 is mounted on a cam roller pin 242 which is shown separately in FIG. 10. Each pin can be formed with an enlarged head 244 to hold the adjacent roller on the pin. The primary rollers 230 keep the vane from flying outwards from centrifugal force (which would damage the engine block) and the secondary rollers 232 keep the vane from being driven inwards from combustion pressure and the profile of the cam at engine start up. Mounting each primary roller and a secondary roller on a single shaft reduces manufacturing costs. This also helps eliminate the need for additional holes in the vane which increases the strength of the vane and provides more space in the vicinity of the cam device.

Figure 9:
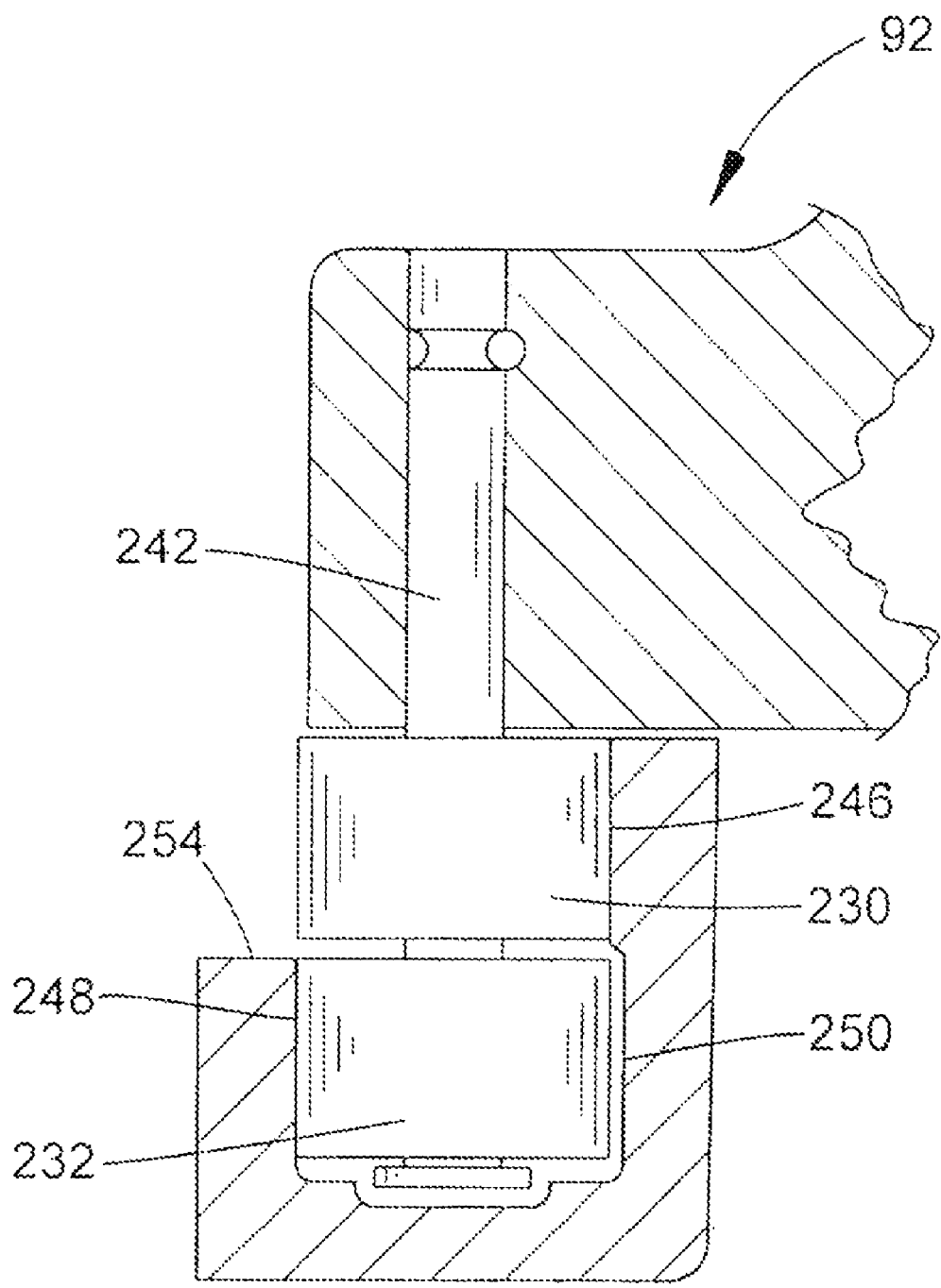
FIG. 9 is a detail view showing a transverse cross-section of a portion of one cam device and two control rollers running on its two tracks.

As will be seen from FIGS. 8 and 9 as well as FIGS. 5 and 6, in this engine the cam rollers are located on the inside of their respective cam device 106, 108. As each of these cam devices is of similar construction only the construction of the interior of the cam device 106 will be described. The cam device is formed with a primary roller track at 246 and a secondary roller track 248 which is opposite the track 246 and formed by interior wall 254. The surface 250 located opposite the track 248 is only a clearance surface that neither roller engages. It will be appreciated that the primary roller track 246 is offset from the secondary roller track 248 in an axial direction relevant to the axis of rotation of the rotor. The primary roller track 246 is also offset from clearance surface 250 in an axial and radial direction relevant to the axis of rotation of the rotor (see FIG. 9). The primary rollers 230 roll simultaneously in an opposite direction compared to the secondary rollers during the progress of the vane around the rotor chamber. The reason for the use of both the primary rollers and the secondary rollers as opposed to a single pair of rollers should be clear from the fact that a roller bearing cannot roll in a trench while in contact with both walls of the trench. When this happens the roller will just skid without spinning and will act like a pin in a track. A pin in a track would require positive oil pressure in order to ride on an oil film to keep it from burning up from excessive friction. If only one roller is used in a cam trench, then there would have to be clearance between the roller and the walls so that at no point in time during rotation will the roller touch both walls at the same time. Such a clearance would result in loss of full controllability of the vane in that the vane could move closer or further from the engine block surface. By using both primary and secondary rollers and two tracks, there is very little end play on each vane as it rotates with the rotor. This cam construction allows full control of each vane at all times during the rotation of the rotor. The cam devices 106, 108 are made of hardened aluminum alloy in an exemplary embodiment, this alloy being anodized to the hardness required by the cam roller bearing.

Figure 10:
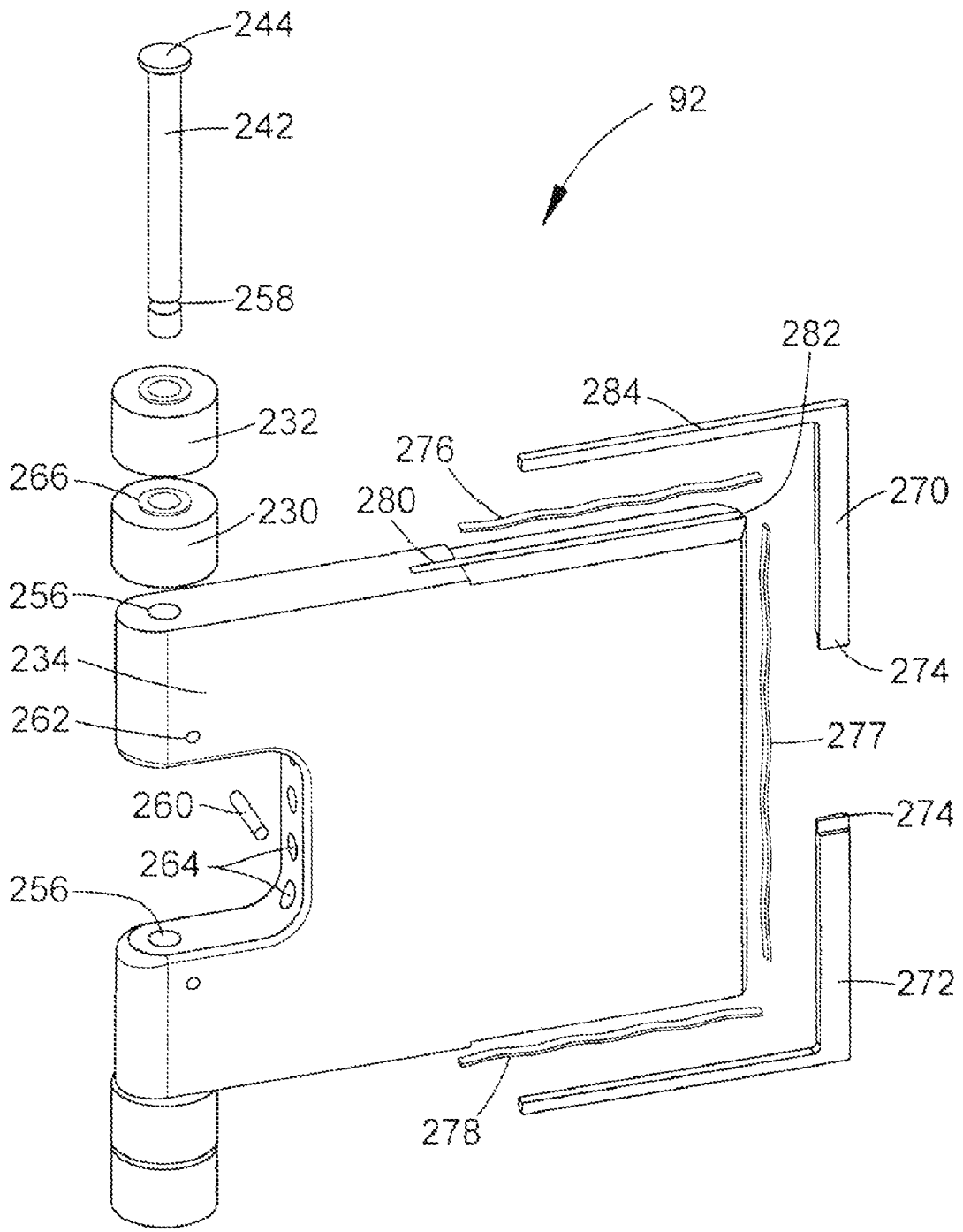
FIG. 10 is an exploded view of a vane used in the engine of FIG. 1.

FIG. 10 provides further details of the construction of each rotor vane 92. In particular it will be seen that the radially inward section 234 of the vane is formed with two holes 256 each adapted to receive a section of a corresponding cam roller pin 242. The pin is formed with a circumferentially extending slot 258 near its inner end. A small spring pin 260 extends through hole 262 formed in the vane and along one side of the slot 258 in order to lock the roller pin in place. If desired, a number of holes 264 can be formed in the vane in order to reduce the weight thereof without substantially compromising the strength and durability of the vane. In an exemplary form, the rollers 230, 232 are provided with roller bearings 266 to facilitate their free rotation on the roller pin. It is also possible to construct the rollers using solid bearings in some circumstances.

Also shown in FIG. 10 are two full corner seals 270, 272 each of which forms a right angle and each of which has a reduced end section 274 which overlaps with the end section of the other seal. An exemplary form of each corner seal is made of hardened steel but it is also possible to construct these seals from ceramic or other suitable, known engine seal materials. These two seals are spring biased by means of three wavy leaf springs 276, 277, 278. These springs together with the seals are accommodated in side grooves 280 formed on opposite sides of the vane and a vane tip groove 282 (seen best in FIG. 15). This improved vane seal construction has several advantages including the following:

(1) it reduces a number of vane seal parts;

(2) it allows thermal expansion of the two corner seals without losing contact area, thus maintaining pressure; and (3) the use of corner seals reduces the seal gaps preventing blow by of gases and reduces the chance of seal chatter by absorbing vibrations through the side leg 284 of each corner seal.

Figure 11:
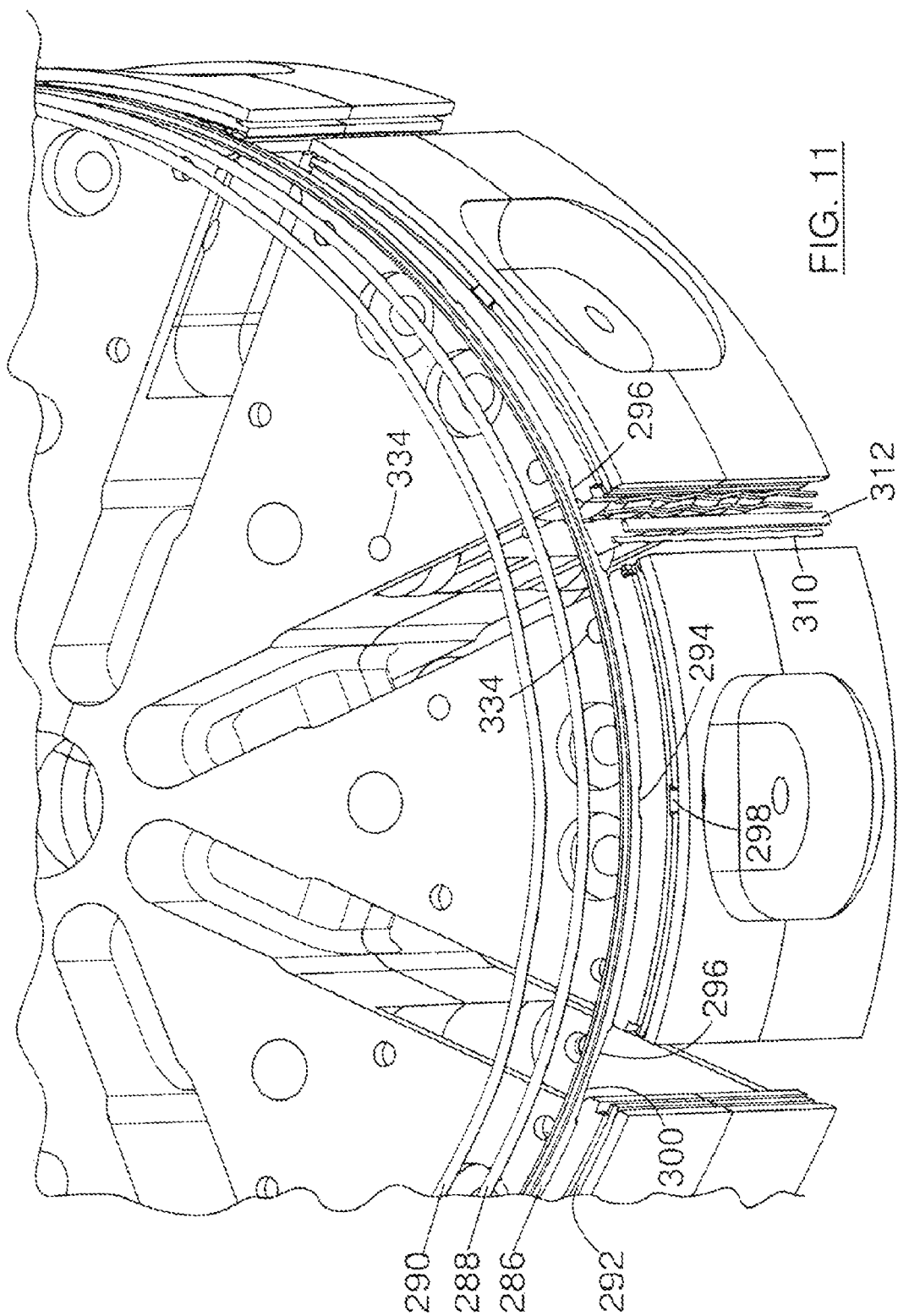
FIG. 11 is an enlarged perspective view of a quarter section of the rotor with the vanes omitted, this view showing in an exploded manner rotor seal details and vane seal details.

FIG. 11 illustrates details of the aforementioned rotor seal assembly 148. The assembly includes an annular rotor seal 286, an annular shim 288, and an annular wavy spring 290 which biases the seal towards the rotor. The rotor seal 286 fits into a series of arcuate grooves 292 formed about its respective side of the rotor. The rotor seal in the illustrated embodiment is formed with alternating small recesses 294 and substantially larger and longer recesses 296, both types of recesses facing the side of the rotor. The purpose of the recesses 294 is to provide an engagement between the seal and the rotor which is formed with catches or protuberances 298 in the grooves 292 which engage these recesses. In this way the rotor seal is prevented from moving in the circumferential direction relative to the rotor. The purpose of the longer recesses 296 is to accommodate the side edges of the vanes. The exemplary recesses 296 are formed with slightly sloping surfaces 300 that extend in a circumferential direction from the center of the recess. Matching sloping side edge surfaces 302 (see FIG. 15) are formed on each side edge of each vane in the region of the corner seal. Note also that each recess 296 is slightly longer than the width of the respective vane in order to accommodate vane scraper seals described below. It will be understood that the rotor seal slides along the shim 288 and a notch (not shown) can be formed in the shim to maintain it in position on the side cover of the engine which has a cooperating protuberance. The wavy spring 290 maintains the shim in engagement with the surface of the seal.

Figure 15:
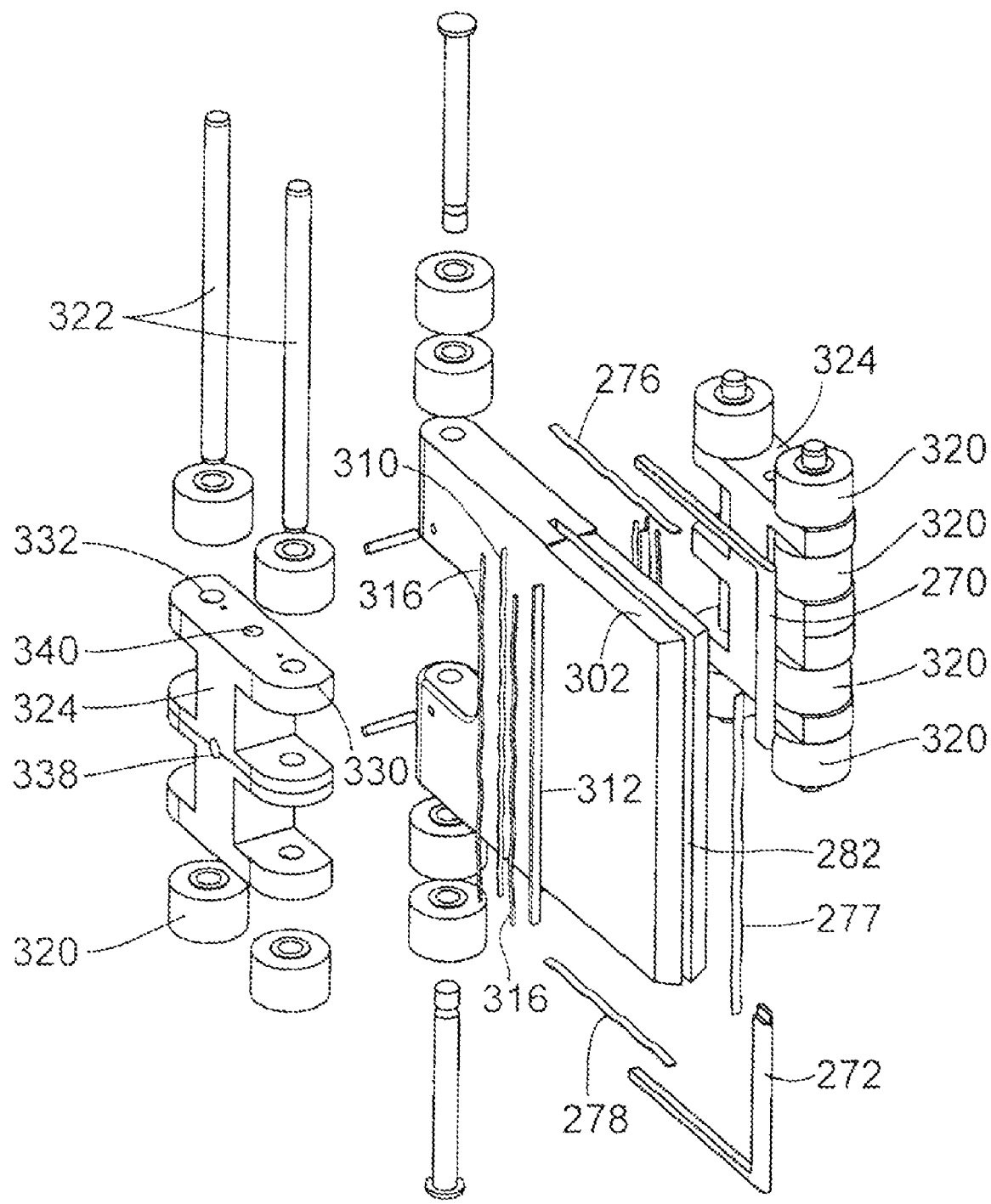
FIG. 15 is an exploded view of a single vane and its control rollers, this view also showing supporting roller units on opposite sides of the vane.

FIGS. 11 and 15 also illustrate the provision of straight scraper seals 310 and straight compression seals 312 which engage the two opposite sides of each vane. Both the scraper and compression seals are mounted near the circumference of the rotor so as to be adjacent the sides of their respective vane. Transversely extending grooves are provided at 314 (see FIG. 16) in the rotor to accommodate these seals and their wavy springs 316. Each compression seal is located radially outwardly relative to its respective scraper seal. The scraper seals are made of spring steel and are made with a slight wave so that they are able to compress longitudinally when the engine heats up. The compression seals 312 interlock with the rotor seal 286. Small pockets (not shown) are machined out of the rotor seal so that both ends of each seal 312 "seat" inside respective pockets in the rotor seals.

FIG. 15 also illustrates the roller support mechanism for each vane and its construction. In the exemplary version shown, opposite sides of the vane are rollably supported by supporting rollers 320 with four or more on each side of the vane. These rollers are supported on elongate support pins 322. These pins extend through a roller supporting base 324 which is made as a single piece. If desired, more than four supporting rollers 320 can be mounted on the base 324, for example to provide additional support to the vane when required. Thus on the base 324 on the right side of FIG. 15, there are six supporting rollers 320 mounted on the base, two at one end and four at the opposite end. Inner and outer ends of the base are formed with pin supporting lugs 330 in which are formed pin holes 332. It will be appreciated that by constructing the rotor of two half sections, it becomes reasonably easy to mount these supporting rollers 320 and their respective bases 324. These rollers and their bases can be first mounted in a lower half section by inserting ends of the pins 322 in holes 334 (see FIGS. 11 and 16) formed in the rotor. The rollers 320 and their bases 324 are accommodated in recesses 336 formed in each pie-shaped section of the rotor on opposite sides thereof. The opposite ends of the pins 322 are then mounted in the holes 334 of the upper half section when it is joined to the lower half section. There is no need to preload the rollers 320 onto the vanes and this reduces the costs of making the engine/machine. The vanes are sized to fit precisely in the space between the opposing rollers. If desired, each base 324 can be formed with slightly tapered sidewalls that meet at a centerline of the base that passes through a central hole 328. This taper is for ease of installation.

The supporting rollers 320 can be lubricated by oil through a series of passageways formed in the rotor and in their respective base 324. In particular lubricating oil can be fed through the central hole 338 formed in each base, this hole feeding lubricant through another central, interconnecting passageway 340 that is connected with passageways (not shown) that extend to the holes 332 in which the support pins for the rollers are mounted. Lubricating oil is delivered to the hole 338 by means of a Y-shaped oil passageway 344 (see FIG. 17) formed in each pie-shaped section of the rotor. One half of each passageway 344 is formed by each half section of the rotor so that when the two half sections are connected together the complete passageway 344 is formed. Two short branches 346 of the passageway extend to the center hole 338 of two roller bases 324. Oil is delivered to the radially inner end of each passageway 344 by means of the central shaft 70 and its central oil outlet ports 348 (see FIG. 14).

Figure 12:
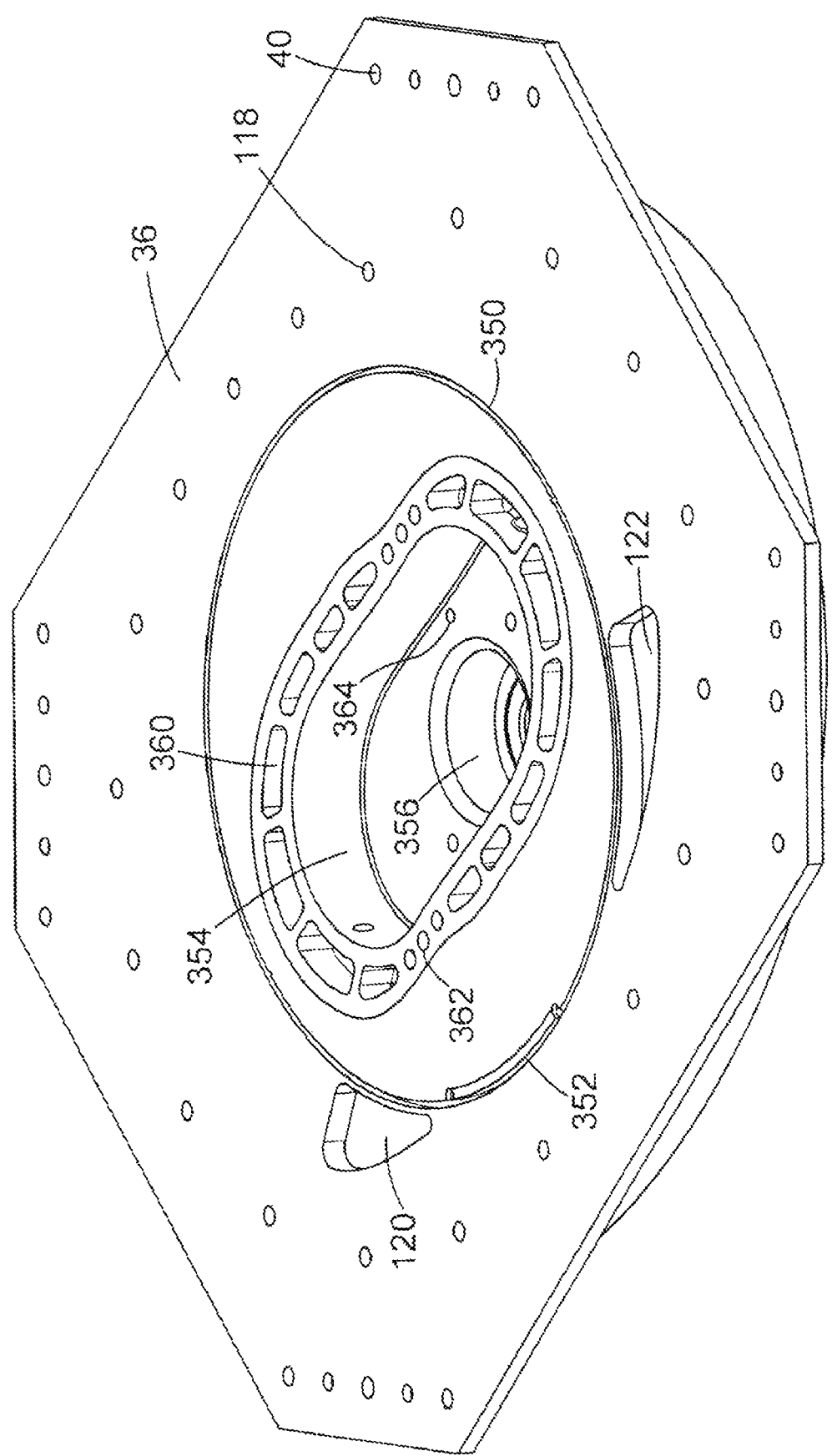
FIG. 12 is a perspective view of a side cover for the engine block according to one embodiment.

FIG. 12 illustrates one embodiment of a side cover for the rotary engine 10. The side cover is formed with a series of the aforementioned bolt holes 40 in each of its four corners, these being used to attach the side cover to the block 34. Formed in a central section of the cover 36 is a groove 350 in which is mounted one of the rotor seal assemblies 148. Formed on a lower side of this groove is an oil receiving trench 352 which collects oil when the engine is operating. Formed in the center of the cover is a generally oval-shaped recess 354 which is sized to closely accommodate one of the cam devices 106, 108. Located in the bottom of this recess is a central, cylindrical cavity 356 in which is mounted the inner main bearing of the rotor shaft. To lighten the weight of the cover, holes 360, 362 can be formed in the cover, the formation of which removes unnecessary material. Several holes 364 formed in the bottom of the recess 354 are used to attach the cam device by bolts.

Figure 13:
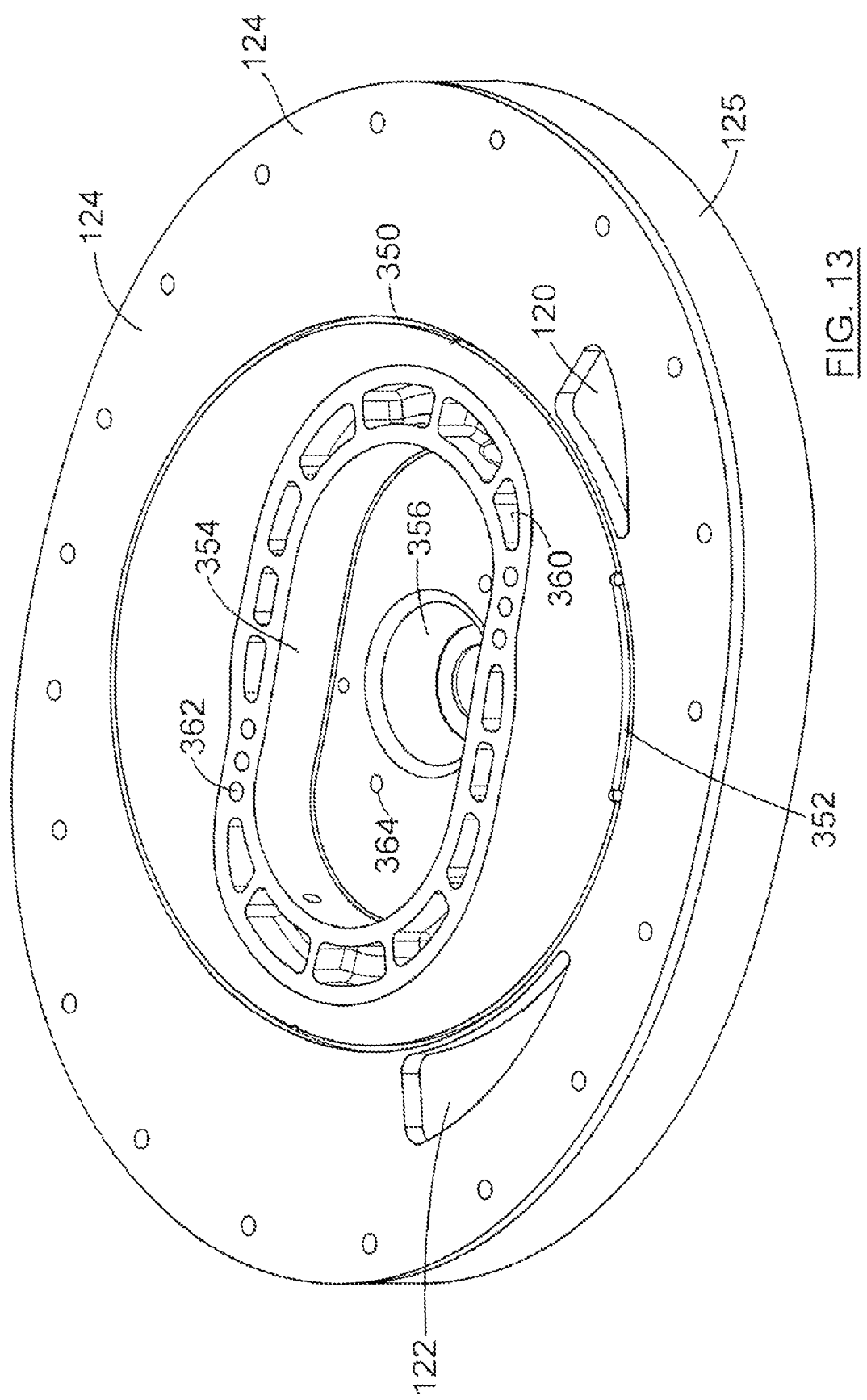
FIG. 13 is a perspective view similar to FIG. 12 showing an alternate form of side cover for the engine.

FIG. 13 illustrates the details of the central portion of the engine cover shown in FIG. 3. As can be seen from a comparison of FIGS. 12 and 13, the two engine covers are similar in their construction except for the differences already noted above. As indicated, the cover can be made as a single metal piece or it can be made of two pieces including a flat plate section 124. If made as two pieces, the plate section 124 can be formed from steel plate while the outer cover section 125 is formed of aluminum alloy.

FIG. 14 illustrates the exterior of the shaft 70 in an exemplary form. This shaft can be made from a single steel piece and is formed with a central shaft section 172 having the lugs 174 thereon. The shaft can be formed with annular recesses at 370 and 372 to accommodate snap rings 132, 146 for holding the main shaft bearings in place.

Figure 16:
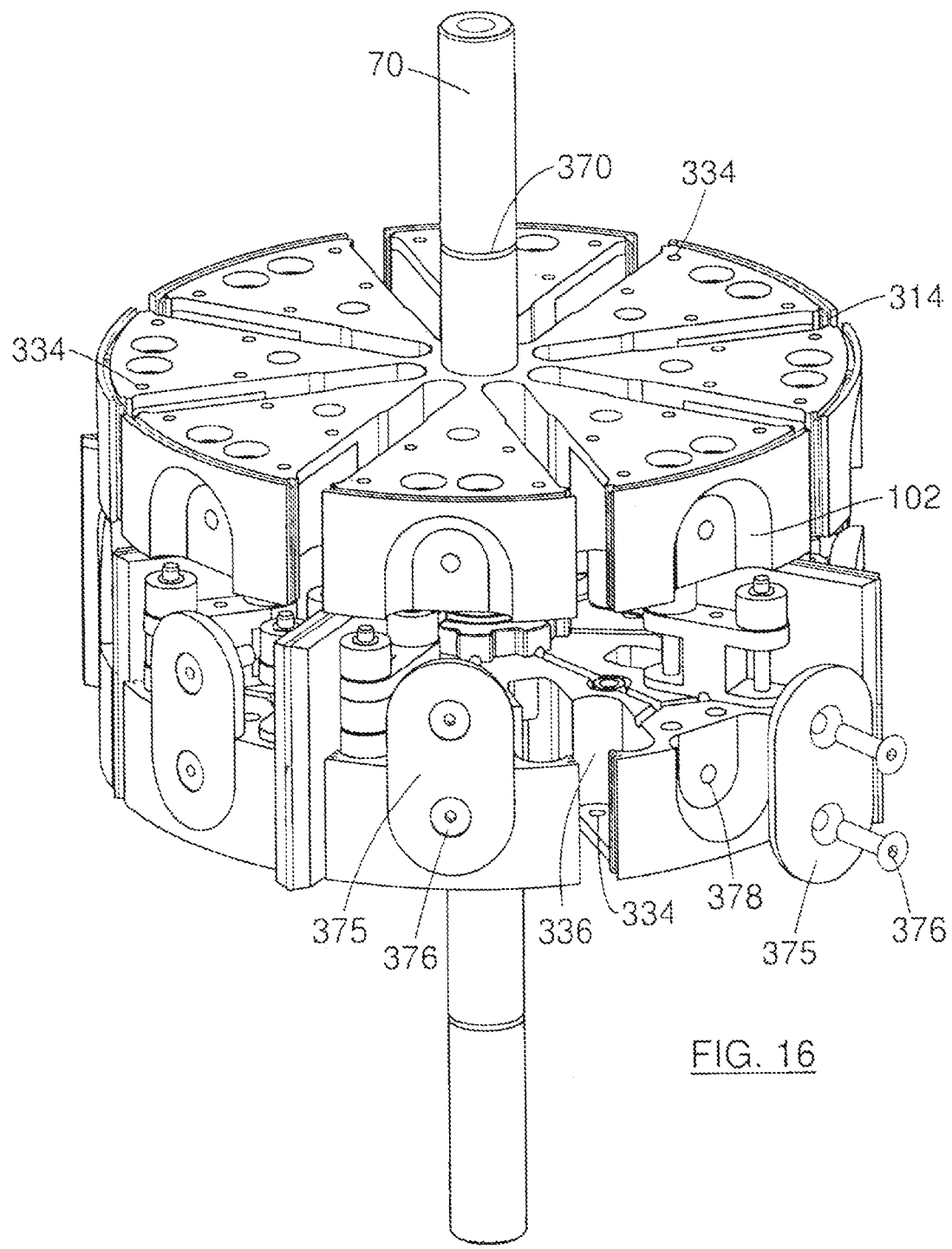
FIG. 16 is a perspective view of the rotor illustrating the use of plugs mountable in cavities in the circumferential surfaces of the rotor.
Figure 17:
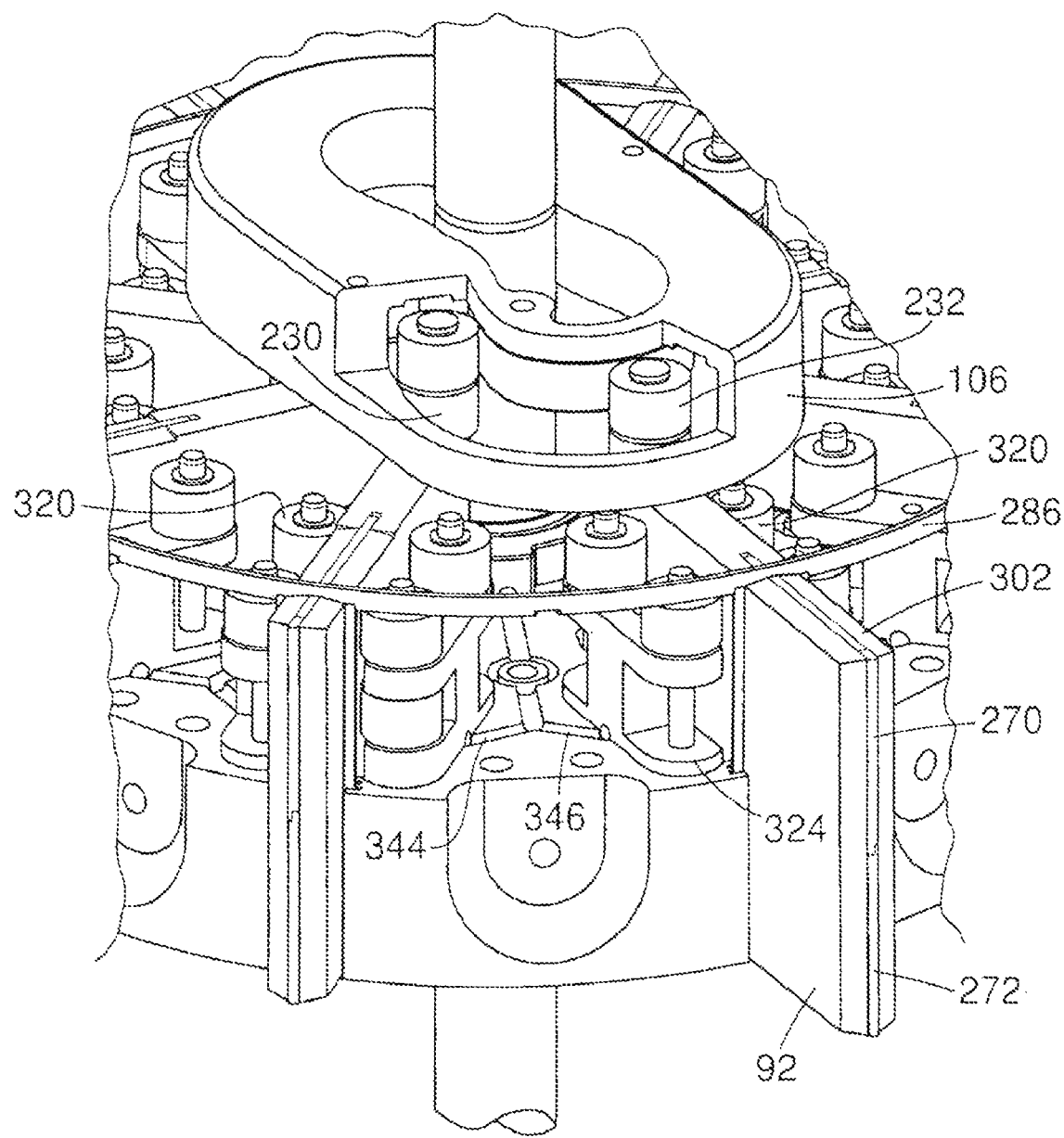
FIG. 17 is an enlarged perspective detail view showing a section of one half of the rotor with two of the vanes mounted therein supported by roller bearings.

FIG. 16 illustrates the optional feature of changing the shape and size of the combustion recesses 102 formed about the periphery of the rotor. By changing the shape and size of these combustion recesses one can vary the amount of displacement and compression achieved in the engine 10. In particular, the size of the compression recesses can be varied by the use of plugs 375 which can either reduce or substantially eliminate the compression recesses. The plugs can be attached by means of threaded fasteners 376 which extend through holes in the plugs and are threaded into holes 378 formed in the bottom of each recess. If the engine is to operate with diesel fuel, the size of the combustion recesses can be changed so as to increase compression to combust the diesel fuel properly, eliminating the need for one or more spark plugs. The engine can also be adapted for use with hydrogen or hydrocarbon fuel.

Figure 18:
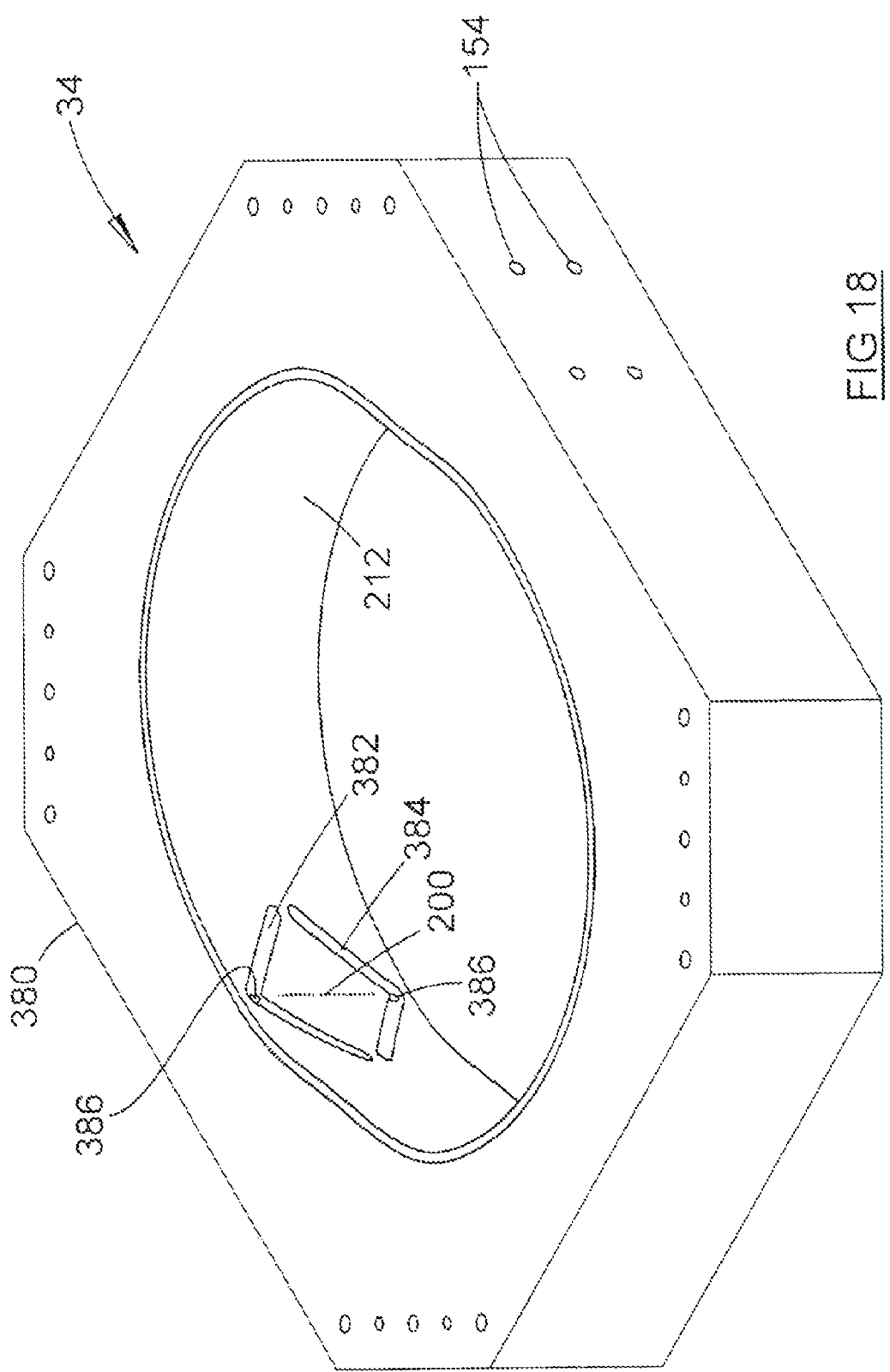
FIG. 18 is a perspective view of one embodiment of the engine block, this view being taken from one side of and from the top of the block and showing oil trenches formed on the bottom section of the inner wall of the block.

FIG. 18 illustrates the engine block 34 by itself and visible in this view is its oval-shaped inner wall 212. The bottom side of the block is indicated at 380. Formed near the bottom side on the inner wall are a pair of V-shaped trenches 382, 384. These oil trenches deliver oil to exit ports 386. The purpose of these trenches is to prevent oil from pooling in the bottom of the block chamber when the engine is turned off. Any oil that collects at the bottom of the block chamber when the engine is shut off is directed by the trenches into the oil feed and return block 156 described above and shown removed from inside the block in FIG. 19. This small block, which is mounted in the wall of the block in a suitable opening, directs the oil into the main oil reservoir for the engine. A gasket or seal 390 is used to seal the joint between the block 156 and the engine block.

Figure 19:
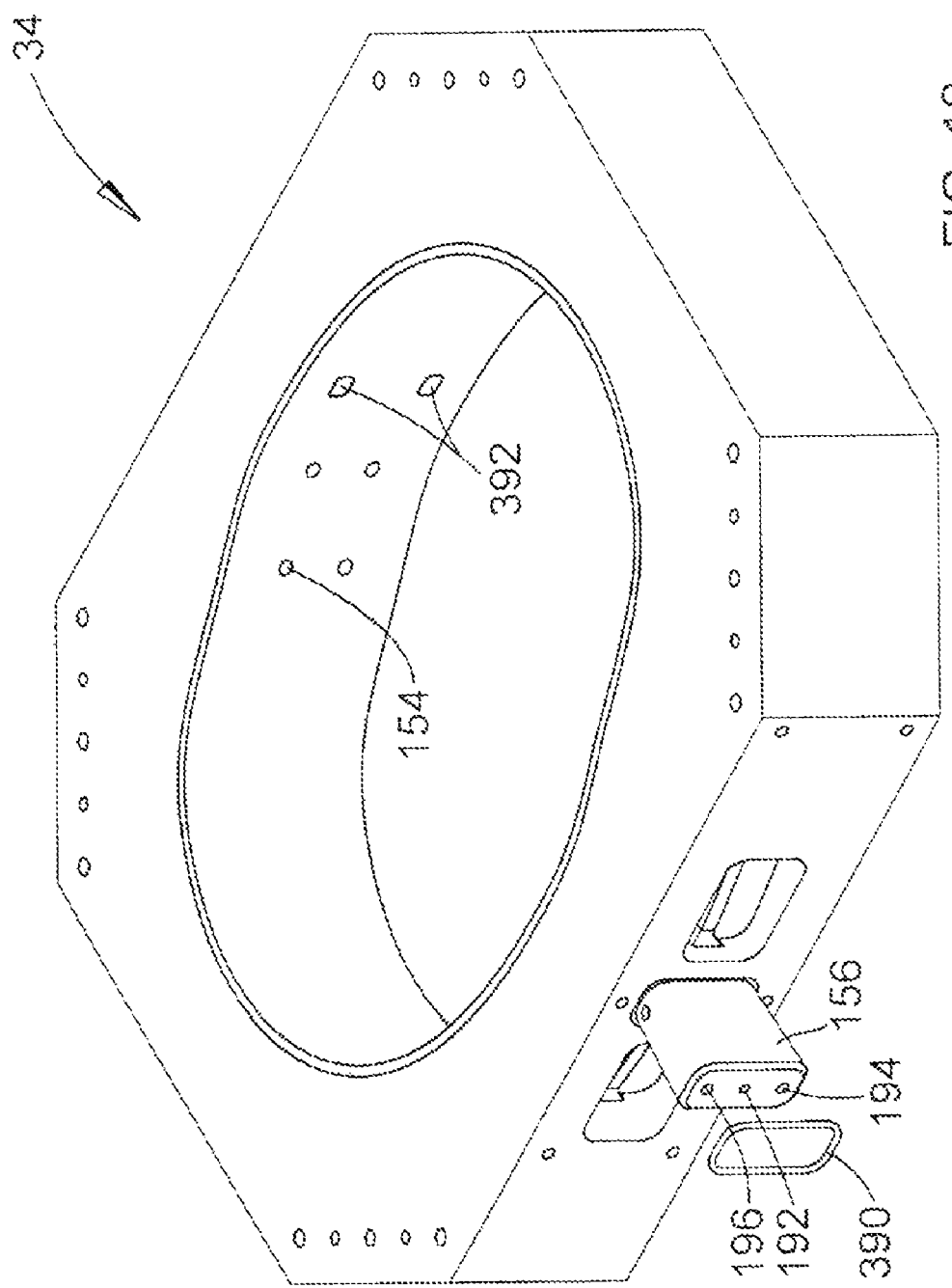
FIG. 19 is another perspective view of the engine block, this view showing one side and the bottom of the block.

FIG. 19 illustrates one version of the engine block 34 which can be made of aluminum alloy with suitably heat treated inner surfaces that will withstand the high temperatures which are generated by the engine operation. This view illustrates the use of two bleed off trenches 392 formed on an upper section of the inner wall of the block. These trenches are primarily provided for HCCI application wherein HCCI stands for Homogeneous Charge Compression Ignition. Although diesel is one form of fuel that is used in this type of engine, other forms of fuel are also possible. In this type of engine, when the autoignition temperature of the fuel is reached, the fuel will spontaneously ignite causing detonation. In order to reduce the pre-ignition condition, the trenches 392 are cut into the inner wall and are located between the combustion and compression chambers for the purpose of allowing pressure bleed off. This pressure bleed off, in addition to preventing premature ignition, will also cause turbulence in the fuel mixture, which is desirable for complete combustion.

Although the present invention has been illustrated and described as embodied in various exemplary embodiments, e.g. embodiments having particular utility as in internal combustion engine, compressor etc. It is to be understood that the present invention is not limited to the details shown herein, since it will be understood that various omissions, modifications, substitutions and changes in the form and details of the disclosed machines and components and their operations may be made by those skilled in the art without departing in any way from the spirit and scope of the present invention. For example, those of ordinary skilled in the art will readily adapt the present disclosure for various other applications without departing from the spirit or scope of the present invention. The corresponding structures, materials, acts, and equivalents of all means or step plus function elements in the claims below are intended to include any structure, material, or acts for performing the functions in combination with other claimed elements as specifically claimed.

We claim:

1. A rotary machine comprising:
   a stator forming a chamber for a rotor, said stator having two sidewalls defining opposite sides of said chamber and a substantially continuous, circumferentially extending inner wall, said stator having at least one inlet and at least one outlet;
   a rotor mounted in said chamber for rotation about a central axis of rotation and defining with said stator two cavities at opposite ends of said chamber, said rotor having at least two radially extending slots evenly spaced about said central axis and a central shaft defining said central axis of rotation and supporting said rotor;
   at least two radially movable vanes each of which is mounted in a respective one of said slots and each of which has first and second primary rollers and first and second secondary rollers mounted on a radially inward section of the vane, the first primary and secondary rollers being mounted at a first side edge of their respective vane and the second primary and secondary rollers being mounted at an opposite second side edge of their respective vane;

two roller cam devices each provided on a respective one of said stator sidewalls and positioned centrally adjacent opposite sides of said rotor, said roller cam devices each forming primary and secondary camming surfaces for engaging and controlling radial movement of said primary and secondary rollers respectively, the primary and secondary camming surfaces being formed inside the roller cam devices and the primary and secondary camming surfaces of each roller cam device being offset from each other in an axial direction and in a substantially radial direction relative to said axis of rotation, wherein during operation of the rotary machine, outer tips of said vanes slidingly engage said circumferentially extending inner wall of said stator, said primary rollers limit outward movement of the vanes due to centrifugal forces acting on the vanes and thereby limit substantially transfer of said forces to said inner wall, and said secondary rollers limit and control inwards movement of the vanes.

2. The rotary machine according to claim 1 where each roller cam device is detachably connected by threaded fasteners to its respective stator sidewall and during operation of the rotary machine, said primary rollers on each vane rotate in an opposite direction compared to the direction of rotation of said secondary rollers.

3. The rotary machine according to claim 1 wherein said rotor comprises two round, half rotor sections which are detachably connected to each other and are coaxial.

4. The rotary machine according to claim 1 wherein said rotary machine is a rotary engine, said stator includes an engine block and first and second side covers detachably mounted on opposite sides of said engine block, and said rotary engine has at least one ignition device mounted in at least one port formed in said engine block.

5. A rotary machine according to claim 1 wherein each roller cam device has a central opening for passage of the central shaft on which said rotor is mounted and a continuous interior wall extending around said central opening, said interior wall providing a secondary roller track forming said secondary camming surface.

6. The rotary machine according to claim 1 wherein the first and second rollers mounted at each side of each vane are mounted on a respective single cam roller pin.

7. The rotary machine according to claim 1 wherein the primary rollers have the same external diameter as the secondary rollers and both said primary and secondary rollers are provided with roller bearings to facilitate free rotation thereof.

8. The rotary machine according to claim 1 wherein each roller cam device is made of hardened aluminum alloy.

9. The rotary machine according to claim 1 including additional rollers mounted in said rotor on opposite sides of each slot for rollably supporting said vanes, said additional rollers being mounted to engage opposite sides of their respective vanes during operation of said engine.

10. The rotary machine according to claim 1 wherein said rotary machine is a rotary engine, said stator is an engine block having a first iron insert extending around the chamber for the rotor and forming said circumferentially extending inner wall and at least one of said sidewalls of the stator comprises a cover arrangement in the form of a second iron insert located adjacent to said rotor and in sliding contact with said vanes.

11. A rotary engine comprising:

an engine block forming a rotor chamber and an internal surface extending circumferentially around said rotor chamber, said engine block having at least one inlet for a fuel-air mixture and at least one outlet for discharging exhaust and an ignition source;

a first side cover arrangement connected to a first side of the block;

a second side cover arrangement connected to a second side of the block located opposite said first side;

a rotor having a circumferential surface with a plurality of combustion chambers formed therein and having a plurality of vane receiving slots distributed around said circumferential surface and each located between a respective adjacent pair of said combustion chambers, said rotor being mounted for rotation in said chamber about a central axis of rotation;

a central shaft defining said central axis of rotation and supporting said rotor;

a plurality of radially movable vanes each of which is mounted in a respective one of said slots and each of which has first and second primary rollers and first and second secondary rollers mounted on a radially inward section of the vane, the first primary and secondary rollers being mounted at a first side edge of their respective vane and the second primary secondary rollers being mounted at an opposite second side edge of their respective vane;

two roller cam devices each provided on a respective one of said cover arrangements and positioned centrally adjacent opposite sides of said rotor, said roller cam devices each forming primary and secondary camming surfaces for engaging and controlling radial movement of said primary and secondary rollers respectively, the primary and secondary camming surfaces being formed inside the roller cam devices and the primary and secondary camming surfaces of each roller cam device being offset from each other in an axial direction and in a substantially radial direction relative to said axis of rotation, each roller cam having a central opening for passage of said shaft and a continuous interior wall extending around said central opening, said interior wall providing a secondary roller track forming said secondary camming surface, wherein during operation of the rotary engine, outer tips of said vanes slidably engage said circumferentially extending internal surface of the engine block, said primary rollers limit outward movement of the vanes due to centrifugal forces acting on the vanes and said secondary rollers limit and control inwards movement of the vanes.

12. The rotary engine according to claim 11 wherein said rotor comprises two round, half rotor sections which are detachably connected to each other and are coaxial.

13. The rotary engine according to claim 11 wherein the first and second rollers mounted at each side of each vane are mounted on a respective single cam roller pin.

14. The rotary engine according to claim 11 wherein the primary rollers having the same external diameter as the secondary rollers and both said primary and secondary rollers are provided with roller bearings to facilitate free rotation thereof.

15. The rotary engine according to claim 11 wherein each roller cam device is made of hardened aluminum alloy.

16. The rotary engine according to claim 11 wherein each vane has first and second side grooves each formed in a respective one of the opposite side edges of the vane and an outer groove extending across an outer end of the vane and vane seals are partially received in said side and outer grooves and are biased outwardly from said grooves by seal springs.

17. The rotary engine according to claim 11 wherein said rotor has two opposite radially extending sides, circumferentially extending seal slots are formed in each of said radially extending sides, and spring biased rotor seals are mounted in said seal slots.

18. The rotary engine according to claim 11 including a plurality of bearing roller sets each comprising bearing rollers in rolling contact with and supporting a respective one of said vanes when the vane moves in its respective slot and each bearing set being mounted on the rotor in its respective slot so that the bearing rollers of the set roll along opposite side surfaces of their vane as the vane moves in its slot.

19. The rotary engine according to claim 11 wherein said ignition source comprises a plurality of ignition devices mounted in said engine block and arranged to ignite a mixture of fuel and air during an ignition phase of engine operation.

\* \* \* \* \*